US012608333B2

(12) United States Patent
Satou

(10) Patent No.: US 12,608,333 B2
(45) Date of Patent: Apr. 21, 2026

(54) LINK ESTABLISHMENT APPARATUS, METHOD, AND SYSTEM

(71) Applicants:NEC Corporation, Tokyo (JP); NEC Platforms, Ltd., Kawasaki (JP)

(72) Inventor: Akira Satou, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 18/839,791

(22) PCT Filed: Mar. 18, 2022

(86) PCT No.: PCT/JP2022/012841
§ 371 (c)(1),
(2) Date: Aug. 20, 2024

(87) PCT Pub. No.: WO2023/175967
PCT Pub. Date: Sep. 21, 2023

(65) Prior Publication Data
US 2025/0173307 A1 May 29, 2025

(51) Int. Cl.
*G06F 13/42* (2006.01)
*G06F 1/12* (2006.01)

(52) U.S. Cl.
CPC ............ *G06F 13/4291* (2013.01); *G06F 1/12* (2013.01)

(58) Field of Classification Search
CPC ......... G06F 13/4291; G06F 1/12; H04L 7/10; H04L 69/324
See application file for complete search history.

(56) References Cited

U.S. PATENT DOCUMENTS

| | | | | |
|---|---|---|---|---|
| 7,260,101 B2 * | 8/2007 | Sauvage | .............. | H04Q 3/0025 |
| | | | | 379/221.09 |
| 9,594,719 B2 * | 3/2017 | Lida | ....................... | G06F 13/364 |
| 2017/0235689 A1 | 8/2017 | Yang et al. | | |
| 2019/0004563 A1 | 1/2019 | Nelson et al. | | |
| 2022/0038357 A1 * | 2/2022 | Pritsker | ............... | H04L 43/0858 |

FOREIGN PATENT DOCUMENTS

| | | |
|---|---|---|
| CN | 108984445 A | 12/2018 |
| CN | 112187276 A | 1/2021 |
| JP | 2015-122574 A | 7/2015 |
| JP | 2016-208398 A | 12/2016 |

(Continued)

OTHER PUBLICATIONS

International Search Report for PCT Application No. PCT/JP2022/012841, mailed on Jun. 21, 2022.

(Continued)

*Primary Examiner* — Farley Abad

(57) ABSTRACT

A link establishment apparatus is configured to connect to another apparatus via an interface of JESD204B and perform a link establishment procedure for establishing a link with such another apparatus, the link establishment apparatus being further configured to receive a first parameter of JESD204B from the other apparatus in the link establishment procedure, and, in a case in which a second parameter of JESD204B configured in the link establishment apparatus does not match the received first parameter, change the second parameter to match the first parameter.

5 Claims, 17 Drawing Sheets

(56)         References Cited

FOREIGN PATENT DOCUMENTS

| | | | |
|---|---|---|---|
| JP | 2018-046462 | A | 3/2018 |
| JP | 2019-009781 | A | 1/2019 |

OTHER PUBLICATIONS

Microsemi Corporation, HB0400. CoreJESD204BTX v3.1 [online], 2019, [retrieved on Jun. 10, 2022], pp. 7-15, 23. Internet:<URL:https://www.microsemi.com/document-pota]/doc_download/1245162-corejesd204btx-hb>particularly, sections 3.1,4.1.
English translation of Written opinion for PCT Application No. PCT/JP2022/012841, mailed on Jun. 21, 2022.

* cited by examiner

| SYMBOL | DESCRIPTION | VALUE |
|---|---|---|
| L | NUMBER OF LANES TO BE USED | 1-8 |
| M | NUMBER OF CONVERTERS TO BE USED | 1-256 |
| F | NUMBER OF OCTETS IN ONE FRAME | 1-256 |
| Symbol | NUMBER OF SAMPLES IN ONE FRAME | 1-32 |
| N | NUMBER OF CONVERSION BITS | 1-32 |
| N' | NUMBER OF TRANSMISSION BITS PER SAMPLE | 1-32 |
| K | NUMBER OF FRAMES IN ONE MULTI-FRAME | $17/F=<K=<32$, 1-32 |
| CS | NUMBER OF CONTROL BITS PER CONVERSION SAMPLE | 0-3 |
| CF | NUMBER OF CONTROL WORDS | 0-32 |
| HD | HD DATA FORMAT | 0 or 1 |
| SCR | SCRAMBLE CONFIGURATION | 0 or 1 |
| DID | DEVICE IDENTIFICATION NUMBER | - |
| BID | BANK ID | - |
| PHADJ | DAC PHASE ADJUSTMENT | 0-1 |
| ADJDIR | DAC PHASE ADJUSTMENT | 0-1 |
| ADJCNT | DAC PHASE ADJUSTMENT | 0-15 |
| FCHK | FRAME CHECKSUM | 0-255 |
| SUBCLASS | SUBCLASS | 0-2 |

|  | INDICATION | L | M | F | K | Data Rate | N | Scr | LMFC | Sps | Clock |
|---|---|---|---|---|---|---|---|---|---|---|---|
| CONFIGURATION FILE #0 | 484 | 4 | 8 | 4 | 32 | 9.8304G | 16 | On | 32 | 245.76M | 245.76M |
| CONFIGURATION FILE #1 | 442 | 4 | 4 | 2 | 32 | 4.9152G | 16 | On | 16 | 245.76M | 245.76M |
| CONFIGURATION FILE #2 | 244 | 2 | 4 | 4 | 32 | 9.8304G | 16 | On | 32 | 245.76M | 245.76M |
| CONFIGURATION FILE #3 | 288 | 2 | 8 | 8 | 32 | 9.8304G | 16 | On | 64 | 122.88M | 245.76M |

CONVERSION OF DATA RATE = N*M/L/8*10*245.76M

CONVERSION OF LMFC = F*K/4

Fig. 6

| Octet No. | Bit7(MSB) | Bit6 | Bit5 | Bit4 | Bit3 | Bit2 | Bit1 | Bit0(LSB) |
|---|---|---|---|---|---|---|---|---|
| 0 | DID[7:0] | | | | | | | |
| 1 | ADJCNT[3:0] | | | | BID[3:0] | | | |
| 2 | X | ADJDIR | PHADJ | LID[4:0] | | | | |
| 3 | SCR | X | X | L[4:0] | | | | |
| 4 | F[7:0] | | | | | | | |
| 5 | X | X | X | K[4:0] | | | | |
| 6 | M[7:0] | | | | | | | |
| 7 | CS[1:0] | | X | N[4:0] | | | | |
| 8 | SUBCLASS[2:0] | | | N'[4:0] | | | | |
| 9 | JESDV[2:0] | | | S[4:0] | | | | |
| 10 | HD | | | CF[4:0] | | | | |
| 11 | RES1[7:0] | | | | | | | |
| 12 | RES2[7:0] | | | | | | | |
| 13 | FCHK[7:0] | | | | | | | |

Fig. 8

| | ADC PARAMETERS | | | | | | DAC PARAMETERS | | | | | |
|---|---|---|---|---|---|---|---|---|---|---|---|---|
| | LMF | K | Data Rate | N | Scr | Sps | LMF | K | Data Rate | N | Scr | Sps |
| CONFIGURATION FILE #0 | 484 | 32 | 9.8304G | 16 | On | 245.76M | 484 | 32 | 9.8304G | 16 | On | 245.76M |
| CONFIGURATION FILE #1 | 442 | 32 | 4.9152G | 16 | On | 245.76M | 442 | 32 | 4.9152G | 16 | On | 245.76M |
| CONFIGURATION FILE #2 | 244 | 32 | 9.8304G | 16 | On | 245.76M | 444 | 32 | 4.9152G | 16 | On | 245.76M |
| CONFIGURATION FILE #3 | 288 | 32 | 9.8304G | 16 | On | 122.88M | 288 | 32 | 9.8304G | 16 | On | 122.88M |

CONVERSION OF DATA RATE $= N * M / L / 8 * 10 * 245.76M$

CONVERSION OF LMFC $= F * K / 4$

Fig. 10

Fig. 11
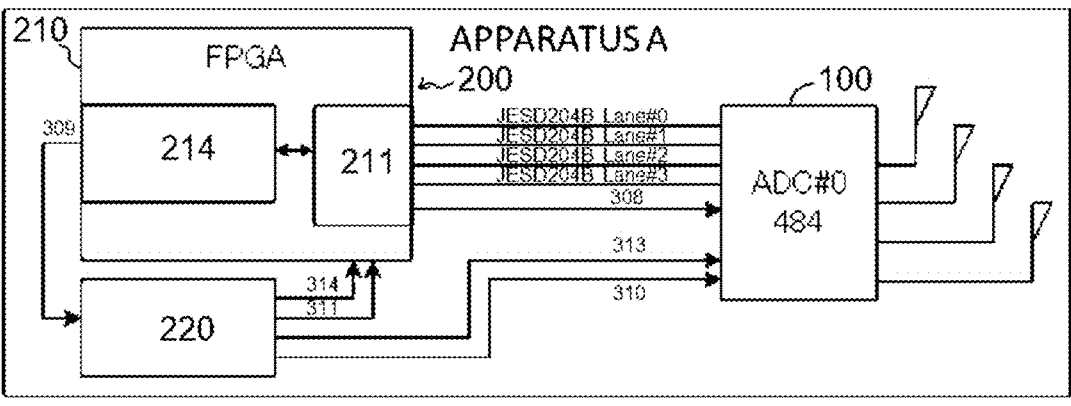
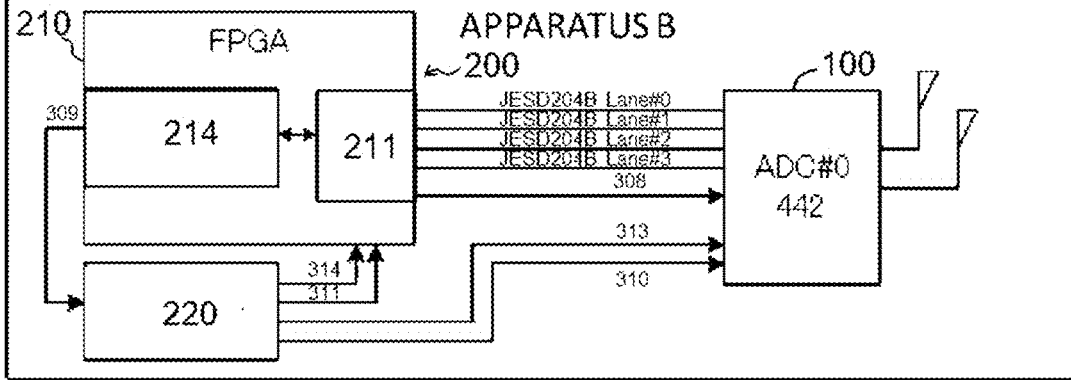
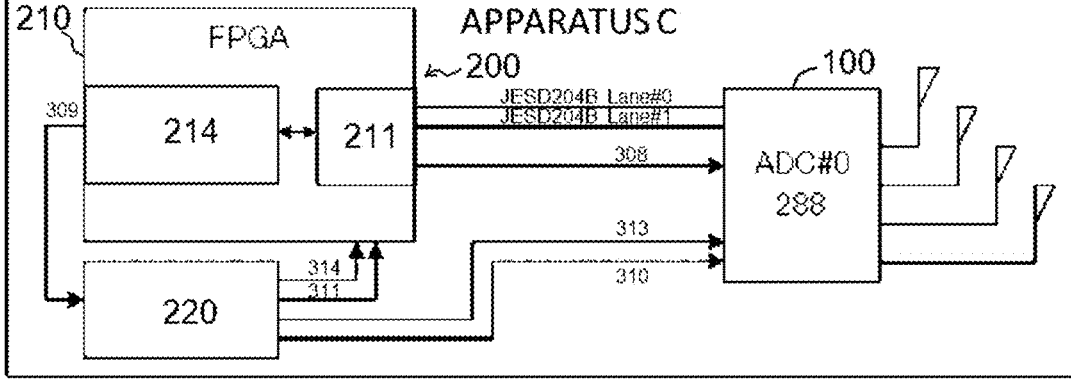
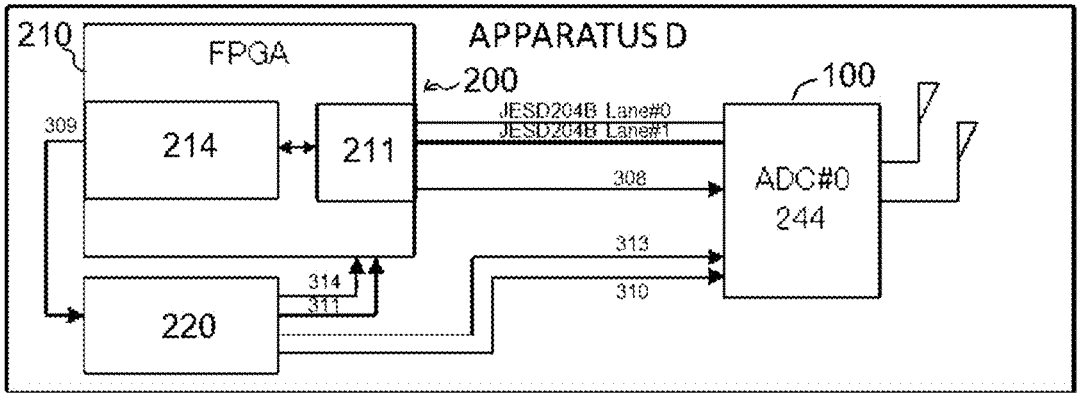

1

LINK ESTABLISHMENT APPARATUS, METHOD, AND SYSTEM

TECHNICAL FIELD

This application is a National Stage Entry of PCT/JP2022/012841 filed on Mar. 18, 2022, the contents of all of which are incorporated herein by reference, in their entirety.

BACKGROUND ART

In recent years, in a field of mobile communication, in order to implement multi-channel access and high-speed data communication, a radio communication apparatus (for example, a base station apparatus) using Multiple Input Multiple Output (MIMO) is used.

Furthermore, there is also a tendency that the number of antennas included in the radio communication apparatus has been increasing every year. Due to such an increased number of antennas, the number of Digital to Analog Converters (DACs) and the number of Analog to Digital Converters (ADCs) implemented in the radio communication apparatus also increase. As a result, the amount of wiring in the radio communication apparatus also increases. In order to solve the issue, the JEDEC Solid State Technology Association has established JESD204B/JESD204C. JESD204B/JESD204C is the serial interface standard established for high-speed and high-resolution data converters (ADC and DAC).

CITATION LIST

Patent Literature

[PTL 1] JP 2019-009781 A
[PTL 2] JP 2018-046462 A
[PTL 3] JP 2016-208398 A

SUMMARY

Technical Problem

The radio communication apparatus is required to include as many antennas as the number matching a situation in which the apparatus is installed. For example, the radio communication apparatus including 32ANT (antennas), 64ANT, or 128ANT is designed.

For the radio communication apparatus, in general, a device in which four ADCs and four DACs are integrated in one TRX_IC (transceiver IC) is used. To connect to the TRX_IC, for example, JESD204B is used. Thus, designing of a device including JESD204B is required.

It is assumed that a plurality of devices having different parameters of JESD204B are designed. In this case, because the parameters cannot be changed, circuits corresponding to the respective devices need to be designed. This has an issue in that designing time and evaluation time of the circuits increase.

The present disclosure provides a technology for communizing a circuit using JESD204B.

Solution to Problem

According to one or more embodiments, a link establishment apparatus is provided. The link establishment apparatus is configured to connect to another apparatus via an interface of JESD204B and perform a link establishment procedure for establishing a link with the another apparatus. The link establishment apparatus includes a receiving means for receiving a first parameter of JESD204B from the another apparatus in the link establishment procedure, and a changing means for, in a case in which a second parameter of JESD204B configured in the link establishment apparatus does not match the first parameter received by the receiving means, changing the second parameter to match the first parameter.

According to one or more embodiments, a method performed in a link establishment apparatus is provided. The link establishment apparatus is configured to connect to another apparatus via an interface of JESD204B and perform a link establishment procedure for establishing a link with the another apparatus. The method includes receiving a first parameter of JESD204B from the another apparatus in the link establishment procedure, and in a case in which a second parameter of JESD204B configured in the link establishment apparatus does not match the received first parameter, changing the second parameter to match the first parameter.

According to one or more embodiments, a system is provided, the system including a first apparatus and a second apparatus, the first apparatus being configured with a first parameter of JESD, the first apparatus being configured to be capable of changing the first parameter, and the second apparatus being connected to the first apparatus via an interface of JESD204B. The first apparatus and the second apparatus are configured to perform a link establishment procedure for establishing a link between the first apparatus and the second apparatus. The second apparatus includes a receiving means for receiving the first parameter of JESD204B from the first apparatus in the link establishment procedure, and a changing means for, in a case in which a second parameter of JESD204B configured in the second apparatus does not match the first parameter received by the receiving means, changing the second parameter to match the first parameter.

Advantageous Effects of Invention

According to the configuration, a circuit using JESD204B can be commonalized. Issues, configurations, and effects other than those described above become apparent in the following description of the example embodiments.

BRIEF DESCRIPTION OF THE DRAWINGS

Figure 1:
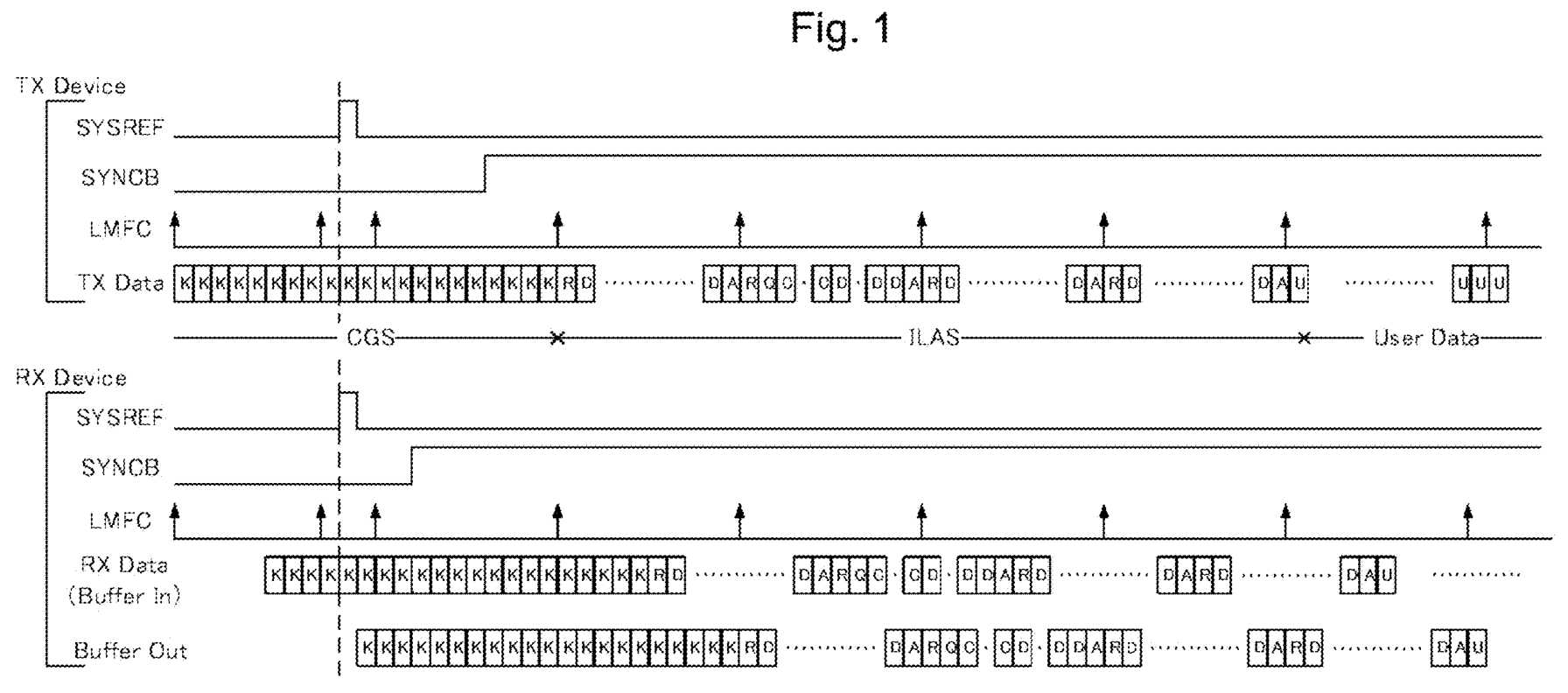

FIG. 1 is a diagram for illustrating basic contents of a link establishment procedure (linkup sequence) of JESD204B;

FIG. 2 is a list illustrating a part of parameters used in JESD204B;

FIG. 3 is a diagram for illustrating a basic configuration of a system including a transmission device (TX device) and a reception device (RX device) illustrated in FIG. 1;

FIG. 5 is a diagram illustrating contents of a plurality of configuration files;

FIG. 6 is a diagram illustrating parameters of JESD204B received in a multi-frame;

FIG. 8 is a diagram illustrating contents of a plurality of configuration files defining combinations of parameters of JESD204B of an ADC and parameters of JESD204B of a DAC;

FIG. 10 is a diagram illustrating an example of a configuration of a system according to the second example alteration of the first example embodiment;

FIG. 11 is a diagram illustrating an example of a configuration of a system according to a third example alteration of the first example embodiment;

DESCRIPTION OF THE EXAMPLE EMBODIMENTS

Figure 4:
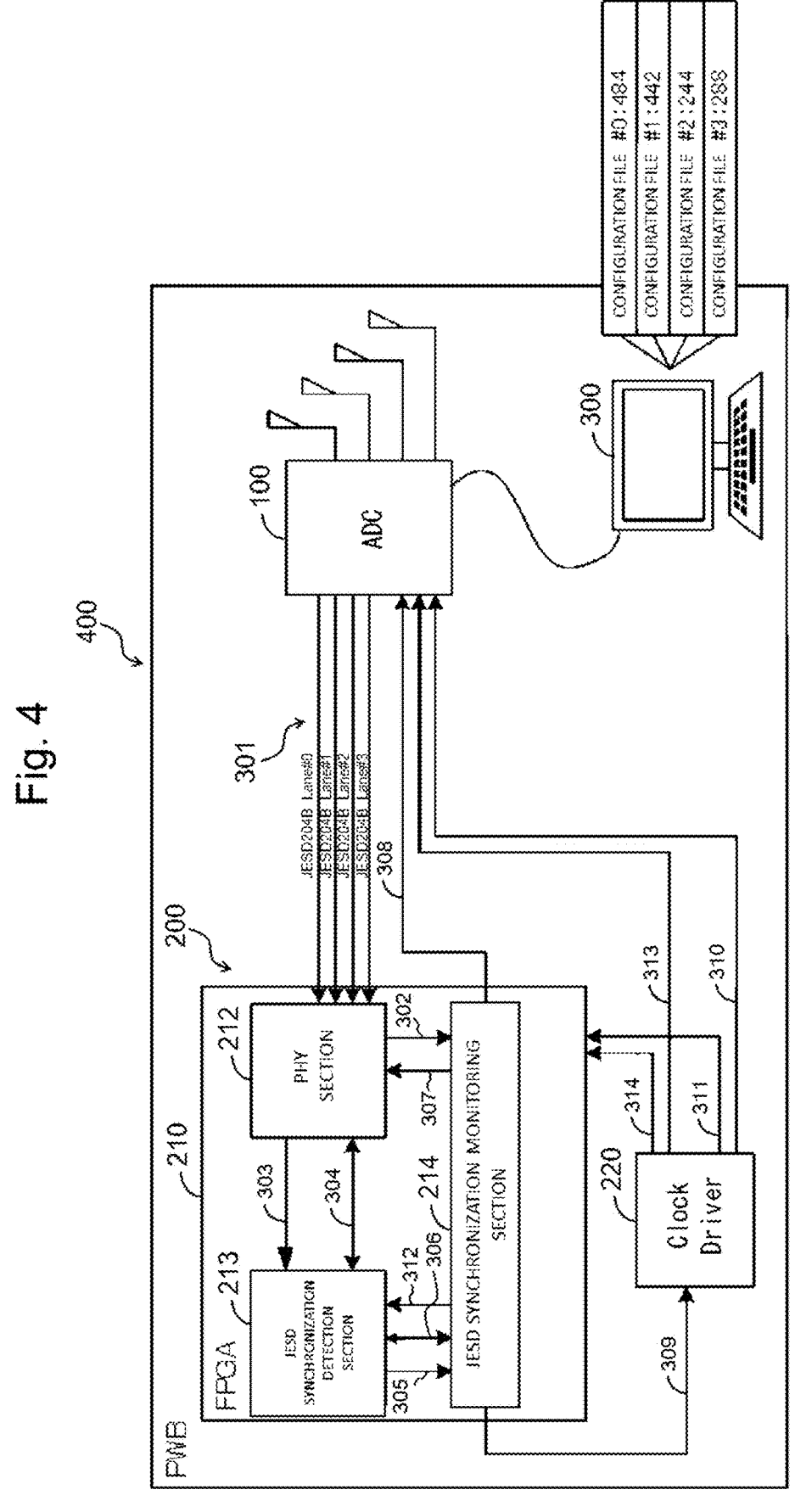
FIG. 4 is an example of a configuration of a system according to a first example embodiment.

Hereinafter, one or more example embodiments will be described with reference to the accompanying drawings. Note that, in the Specification and drawings, elements to which similar descriptions are applicable are denoted by the same reference signs, and overlapping descriptions are hence omitted.

Descriptions will be given in the following order.
1. Overview of Example Embodiments
2. First Example Embodiment
    2-1. JESD204B
    2-2. Basic Configuration of System
    2-3. Specific Configuration of System
    2-4. Operation Examples of Reception Device and Transmission Device
    2-5. Flow of Processing of Reception Device
    2-6. Effects
    2-7. Example Alterations
3. Second Example Embodiment
    3-1. Configuration of Link Establishment Apparatus
    3-2. Flow of Processing
4. Other Example Embodiments

1. Overview of Example Embodiments

An overview of one or more example embodiments to be described below will be described. In one or more example embodiments, a link establishment apparatus is provided. The link establishment apparatus is configured to connect to another apparatus via an interface of JESD204B and perform a link establishment procedure for establishing a link with such another apparatus.

The link establishment apparatus includes a reception section and a change section. The reception section receives a first parameter of JESD204B from such another apparatus in the link establishment procedure. In a case in which a second parameter of JESD204B configured in the link establishment apparatus does not match the first parameter received by the reception section, the change section changes the second parameter to match the first parameter.

According to the configuration, even in a case in which a plurality of devices having different parameters of JESD204B are designed, the configuration of the link establishment apparatus can be commonalized. This can reduce designing time and evaluation time of the apparatus.

2. First Example Embodiment

Next, with reference to FIG. 1 to FIG. 15, a first example embodiment and its example alterations will be described.

2-1. JESD204B

First, as a technology related to the example embodiment, JESD204B will be described.

As described above, JESD204B is the serial interface standard established for high-speed and high-resolution data converters (ADC and DAC). According to JESD204B, by using a SYSREF signal as a reference timing, high-speed serial transmission can be performed with a delay between a transmission device and a reception device being fixed.

The link establishment procedure in JESD204B will be described. The procedure is also referred to as a "linkup sequence". In JESD204B, a synchronization link is established using three states (phases), specifically, "Code Group Synchronization (CGS)", "Initial Lane Alignment Sequence (ILAS)", and "UserData". Specifically, after power is turned on or a reset is cancelled, the state is in CGS being an initial state. Next, the state transitions to ILAS, and then transitions to UserData. UserData is a state in which a link is established.

FIG. 1 is a diagram for illustrating basic contents of the link establishment procedure of JESD204B. In FIG. 1, a "TX device" represents a "transmission device", and an "RX device" represents a "reception device".

In CGS being the initial state, the transmission device continues to transmit K (K28.5=BCh). In a case in which the transmission device detects "SYSREF=1", the transmission device performs alignment (adjustment) of timings of a Local Multi Frame Clock (LMFC). In a case in which the reception device detects "SYSREF=1", the reception device performs alignment of timings of the LMFC. The reception device sets "SYNCB" to "1" (i.e., SYNCB=1) after the reception device correctly receives a signal (K28.5) and after the alignment completes.

Furthermore, in a case in which the transmission device detects "SYNCB=1", the transmission device transitions to ILAS from the next LMFC timing. Note that, as illustrated in FIG. 1, the transmission device and the reception device receive SYSREF at the same timing.

In ILAS, the transmission device transmits four consecutive multi-frames 1 to 4. Signal transmitted in the four multi-frames 1 to 4 are as follows. Note that, in the Specification, in a case in which some consecutive characters (octet) are transmitted as one unit of data, the unit of data is referred to as a "frame". Furthermore, in a case in which some consecutive frames are transmitted as one unit of data, the unit of data is referred to as a "multi-frame".

Multi-frame 1: This starts from a character/R/(K28.0), is subsequently followed by a dummy signal, and ends with a character/A/(K28.3).

Multi-frame 2: This starts from a character/R/(K28.0), is subsequently followed by/Q/ (K28.4), and is followed by 14 octets of link configuration parameters. This is subsequently followed by a dummy signal, and ends with a character/A/(K28.3).

Multi-frame 3: This has the same contents as multi-frame 1. In other words, this starts from a character/R/ (K28.0), is followed by a dummy signal, and ends with a character/A/(K28.3).

Multi-frame 4: This has the same contents as multi-frame 1. This starts from a character/R/(K28.0), is followed by a dummy signal, and ends with a character/A/ (K28.3).

The reception device reads the link configuration parameters from multi-frame 2. In a case in which the reception device determines that there is not a problem in the link configuration parameters, the reception device continues the setting of "SYNCB=1". Note that, in a case in which the reception device determines that there is a problem in the link configuration parameters, the reception device sets SYNCB to "0" (i.e., SYNCB=0).

In a case in which the setting of "SYNCB=1" continues, the state transitions to UserData. On the other hand, in a case in which "SYNCB=0", the state transitions to CGS. In response to the character/R/, the reception device stores the received signal in a buffer (see "Buffer In" of FIG. 1). Furthermore, in response to the LMFC, the reception device reads a signal from the buffer (see "Buffer Out" of FIG. 1). With this, a delay between the transmission device and the reception device is determined.

In UserData, the transmission device transmits an IQ signal. The reception device monitors alignment. In a case in which there is an anomaly, the reception device sets "SYNCB" to "0" (i.e., SYNCB=0). In this case, the state transitions to CGS.

FIG. 2 is a list illustrating a part of parameters used in JESD204B. In the transmission device and the reception device, the parameters illustrated in FIG. 2 are used. Note that, in the Specification, the parameters illustrated in FIG. 2 and parameters (for example, a data rate and an LMFC) converted from the parameters illustrated in FIG. 2 are collectively referred to as "parameters of JESD204B".

2-2. Basic Configuration of System

Figure 3:
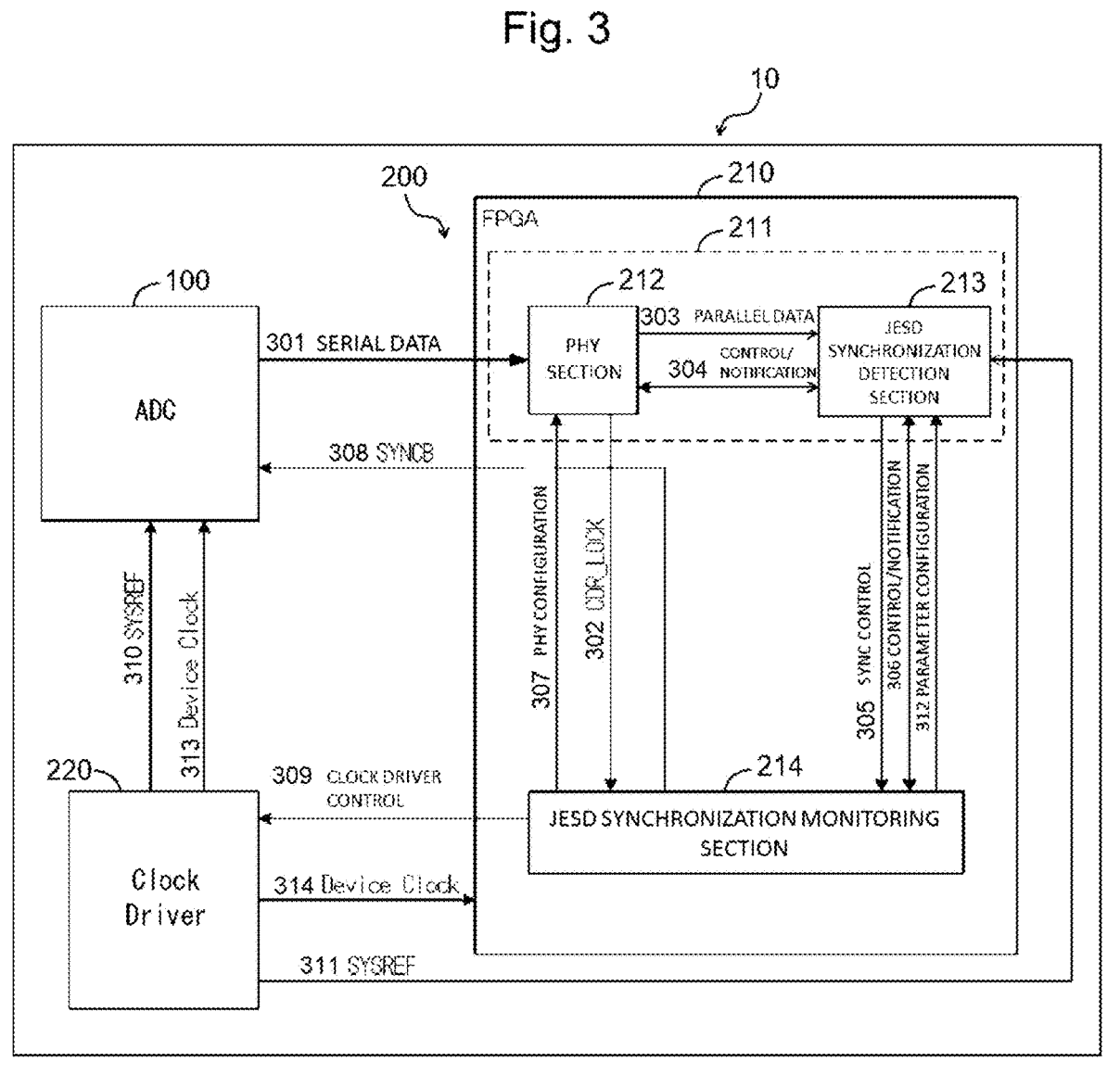

FIG. 3 is a diagram for illustrating a basic configuration of a system 10 including the transmission device (TX device) and the reception device (RX device) illustrated in FIG. 1.

The system 10 includes a transmission device 100 and a reception device 200. The transmission device 100 and the reception device 200 are connected via the interface of JESD204B. The transmission device 100 and the reception device 200 are configured to perform the link establishment procedure (linkup sequence) for establishing a link.

The transmission device 100 is a transmission circuit implemented in accordance with JESD204B, and is an ADC in the present example.

The reception device 200 is a reception circuit implemented in accordance with JESD204B. The reception device 200 includes a processing circuit (processor) 210 and a clock driver 220.

In the present example, the processing circuit 210 is implemented by a field programmable gate array (FPGA). As an internal structure, the FPGA includes a logic element (logic cell), an I/O section, internal wiring, clock-dedicated wiring, a multiplier, a block memory element (for example, a RAM), and the like.

In another example, the processing circuit 210 may be implemented by an application specific integrated circuit (ASIC).

In yet another example, the processing circuit 210 may be configured using another device, for example, a semiconductor device including a central processing unit (CPU) and a memory. In that case, the function of the processing circuit 210 may be implemented by the processor executing a program read from the memory. Furthermore, the function of the processing circuit 210 may be implemented by the FPGA and the CPU and the memory provided around the FPGA.

The processing circuit 210 includes, as functional blocks, a JESD processing section 211 and a JESD synchronization monitoring section 214. The JESD processing section 211 includes a physical layer (PHY) section 212 and a JESD synchronization detection section 213.

In the following, for the sake of simplicity of description, the physical layer section 212 is referred to as a "PHY section 212", the JESD synchronization detection section 213 is referred to as a "synchronization detection section 213", and the JESD synchronization monitoring section 214 is referred to as a "synchronization monitoring section 214".

The PHY section 212 is connected to the transmission device 100 via the interface of JESD204B. The PHY section 212 has a Clock Data Recovery (CDR) function and a serial parallel conversion function.

The synchronization detection section 213 has an 8B/10B decoding function. In data transmission of JESD204B, conversion data is divided into 8-bit blocks, and the data (octet) is converted into 10-bit data (characters) to be transmitted. Such a conversion technology is referred to as "8B/10B". Furthermore, the synchronization detection section 213 has a function of detecting a synchronization state of JESD (i.e., a synchronization state between the transmission device 100 and the reception device 200).

The synchronization monitoring section 214 monitors the synchronization state between the transmission device 100 and the reception device 200. Furthermore, the synchronization monitoring section 214 has a function of performing configuration change of the PHY section 212 and configuration change of the synchronization detection section 213.

The clock driver 220 supplies (outputs) a clock signal and a synchronization signal.

Next, signals 301 to 314 illustrated in FIG. 3 will be described.

The serial data 301 is a signal transmitted from the transmission device 100 to the PHY section 212. The serial data 301 is a high-speed serial signal used in JESD204B.

The CDR_LOCK 302 is a signal transmitted from the PHY section 212 to the synchronization monitoring section 214. The CDR_LOCK 302 is a signal indicating a synchronization state for a serial signal received by the PHY section 212.

The parallel data 303 is a signal transmitted from the PHY section 212 to the synchronization detection section 213. The parallel data 303 is a parallel signal obtained by Serial to Parallel (SP) conversion in the PHY section 212, and is a signal in a format of being decoded by 8B/10B.

The control/notification 304 includes a signal transmitted from the PHY section 212 to the synchronization detection section 213 and a signal transmitted from the synchronization detection section 213 to the PHY section 212. The control/notification 304 includes a control signal (reset, Disable, and the like) for the PHY section 212, an access signal to an internal register of the PHY section 212, and the like. Furthermore, the control/notification 304 includes a signal for performing notification of the state of CDR.

The SYNC control 305 is a signal transmitted from the synchronization detection section 213 to the synchronization monitoring section 214. In a case in which there is not an anomaly in the parallel data 303 received by the synchronization detection section 213 in CGS, the SYNC control 305 is "1". Furthermore, in a case in which there is an anomaly in processing of the LMFC or 8B/10B and the like in ILAS and UserData, the SYNC control 305 is "0". Note that, in an existing (conventional) JESD circuit, the SYNC control 305 is used as a signal for providing the same function as the SYNCB 308 to be described below.

The control/notification 306 includes a signal transmitted from the synchronization detection section 213 to the synchronization monitoring section 214 and a signal transmitted from the synchronization monitoring section 214 to the synchronization detection section 213. The control/notification 306 includes a signal indicating a state of a signal detected by the synchronization detection section 213, a signal indicating a synchronization state detected by the synchronization detection section 213, and the like. The control/notification 306 includes a signal indicating an 8B/10B decoding state, a signal indicating an anomaly in the parameters of JESD204B, and the like. Furthermore, the control/notification 306 includes an interrupt request, a control signal for an internal register of the synchronization detection section 213, and the like.

The PHY configuration 307 is a signal transmitted from the synchronization monitoring section 214 to the PHY section 212. The PHY configuration 307 is a signal for changing a configuration of the internal register of the PHY section 212.

The SYNCB 308 is a signal transmitted from the synchronization monitoring section 214 to the transmission device 100. The SYNCB 308 is a signal for notifying the transmission device 100 of a state of a signal received by the processing circuit 210, and corresponds to "SYNCB" described in FIG. 1.

The clock driver control 309 is a signal transmitted from the synchronization monitoring section 214 to the clock driver 220. The clock driver control 309 includes a signal for controlling the clock driver 220. For example, the clock driver control 309 includes a signal for performing an internal configuration of the clock driver 220 using a Serial Peripheral Interface (SPI) or the like, and a signal for monitoring a state of the clock driver 220.

The SYSREF 310 is a signal transmitted from the clock driver 220 to the transmission device 100. The SYSREF 310 corresponds to "SYSREF" described in FIG. 1.

The SYSREF 311 is a signal transmitted from the clock driver 220 to the processing circuit 210 (specifically, the synchronization detection section 213). The SYSREF 311 corresponds to "SYSREF" described in FIG. 1.

The parameter configuration 312 is a signal transmitted from the synchronization monitoring section 214 to the synchronization detection section 213. The parameter configuration 312 is a signal for changing a configuration of the parameters of JESD204B included in the synchronization detection section 213.

The device clock 313 is a signal transmitted from the clock driver 220 to the transmission device 100. The device clock 313 is a signal indicating an operation clock.

The device clock 314 is a signal transmitted from the clock driver 220 to the processing circuit 210. The device clock 314 is a signal indicating an operation clock.

2-3. Specific Configuration of System

FIG. 4 is an example of a configuration of a system 400 according to the first example embodiment. Note that, in FIG. 4, the same components as those of FIG. 3 are denoted by the same reference signs as those of FIG. 3, and description thereof will thus be omitted. The system 400 is configured as a part of a radio communication system, for example. The system 400 includes the transmission device 100, the reception device 200, and a control computer 300.

The transmission device 100 is an ADC, similarly to the above description. The transmission device 100 includes four antennas. The reception device 200 includes the processing circuit 210 and the clock driver 220, similarly to the above description. The transmission device 100 and the reception device 200 are implemented on a printed wiring board (PWB).

The transmission device 100 and the reception device 200 are connected via the interface of JESD204B. The transmission device 100 and the reception device 200 are connected using four lines (Lanes #0 to #3) for the sake of transmission of the serial data 301. Furthermore, the transmission device 100 and the reception device 200 are connected using one line for the sake of transmission of the SYNCB 308.

The control computer 300 is an information processing apparatus for configuring the parameters of JESD204B of the transmission device 100. In the present example, the control computer 300 can configure (change) the parameters of JESD204B of the transmission device 100 in accordance with four configuration files #0 to #3.

FIG. 5 is a diagram illustrating contents of configuration files #0 to #3. Each of configuration files #0 to #3 includes a part of the parameters illustrated in FIG. 2 and parameters (for example, a data rate, an LMFC, and the like) converted from the parameters illustrated in FIG. 2.

2-4. Operation Examples of Reception Device and Transmission Device

Next, four operation examples of the transmission device 100 and the reception device 200 will be described. Note that, in the following, for the sake of simplicity of description, initial parameters of JESD204B configured in the transmission device 100 are referred to as "first parameters". Initial parameters of JESD204B configured in the processing circuit 210 of the reception device 200 are referred to as "second parameters".

Operation Example 1

Operation example 1 is an operation of a case in which the first parameters in the transmission device 100 are of configuration file #0 of FIG. 5, and the second parameters in the processing circuit 210 are of configuration file #0 of FIG. 5.

In the present example, the first parameters in the transmission device 100 and the second parameters in the processing circuit 210 match. For example, the data rate (data rate related to the serial data 301) configured in the transmission device 100 and the data rate (data rate related to the serial data 301) configured in the PHY section 212 match. Other first parameters also match other second parameters. In this case, after the system 400 is started or after reset is cancelled, a link is not established between the transmission device 100 and the processing circuit 210 of the reception device 200. Thus, the state of JESD204B is CGS being an initial state. The transmission device 100 and the reception device 200 perform the link establishment procedure (linkup sequence) as follows.

In CGS, the transmission device 100 continues to transmit K (K28.5=BCh). The data rate of the serial data 301 transmitted by the transmission device 100 and the data rate configured in the PHY section 212 match, and thus the CDR function of the PHY section 212 is locked.

The CDR LOCK 302 is represented by 1 bit per lane (i.e., 1 bit/lane). The lock of the CDR function causes the CDR_LOCK 302 to be "1111". The synchronization monitoring section 214 receives the CDR LOCK 302. In a case in which the synchronization monitoring section 214 detects the lock of the CDR function corresponding to Lane #0 (i.e., detects a bit "1" corresponding to Lane #0), the synchronization monitoring section 214 causes the clock driver 220 to output the SYSREF 310 and the SYSREF 311. Specifically, the synchronization monitoring section 214 outputs the clock driver control 309 to the clock driver 220. In response to this, the clock driver 220 outputs the SYSREF 310 to the transmission device 100, and outputs the SYSREF 311 to the synchronization detection section 213.

The synchronization detection section 213 detects "SYSREF 311=1". The synchronization detection section 213 resets LMFC timing in the processing circuit 210. Furthermore, in a case in which the synchronization detection section 213 detects that there is not an 8B/10B error in the parallel data 303, the synchronization detection section 213 sets the SYNC control 305 to "1", and outputs the SYNC control 305 to the synchronization monitoring section 214.

The synchronization monitoring section 214 receives the SYNC control 305. In response to this, the synchronization monitoring section 214 sets the SYNCB 308 to "1", and outputs the SYNCB 308 to the transmission device 100. Alternatively, the synchronization monitoring section 214 detects the lock of the CDR function corresponding to Lane #0 via the CDR LOCK 302, and detects that there is not an 8B/10B error in the parallel data 303 via the control/notification 306. In response to the detection, the synchronization monitoring section 214 sets the SYNCB 308 to "1", and outputs the SYNCB 308 to the transmission device 100.

The transmission device 100 detects "SYSREF 310=1". The transmission device 100 resets internal LMFC timing of the transmission device 100. Next, the transmission device 100 detects "SYNCB 308=1". With this, the transmission device 100 transitions to ILAS from the next LMFC timing.

In ILAS, the synchronization detection section 213 receives the above-described four consecutive multi-frames (multi-frames 1 to 4) via the PHY section 212. The synchronization detection section 213 extracts the parameters of JESD204B (i.e., the first parameters in the transmission device 100) illustrated in FIG. 6. The synchronization detection section 213 stores the extracted first parameters in the register.

In a case in which the synchronization detection section 213 completes storing the parameters in the register, the synchronization detection section 213 transmits the control/notification 306 to the synchronization monitoring section 214.

In response to the control/notification 306, the synchronization monitoring section 214 compares the contents of the parameters stored in the register (i.e., the first parameters in the transmission device 100) and the second parameters in the processing circuit 210. As described above, the contents of the first parameters stored in the register and the contents of the second parameters in the processing circuit 210 match.

Furthermore, the synchronization monitoring section 214 calculates a predetermined parameter from the first parameters stored in the register. In the following, a parameter of JESD204B calculated from the first parameters stored in the register is referred to as a "third parameter". Furthermore, a parameter of JESD204B configured in the clock driver 220 is referred to as a "fourth parameter".

The synchronization monitoring section 214 compares the calculated third parameter and the fourth parameter in the clock driver 220. In the present example, the third parameter and the fourth parameter are a period of the LMFC. The synchronization monitoring section 214 determines whether the period of the LMFC (fourth parameter) configured in the clock driver 220 matches the calculated period of the LMFC (third parameter). The expression "match" herein means "the period of the LMFC (fourth parameter) configured in the clock driver 220 is exponentiation of ½ of the calculated period of the LMFC (third parameter)". In a case in which the period of the LMFC (fourth parameter) configured in the clock driver 220 matches the calculated period of the LMFC (third parameter), the synchronization monitoring section 214 transmits the control/notification 306 to the synchronization detection section 213 to perform notification of establishment of a link (i.e., linkup).

Operation Example 2

Operation example 2 is an operation of a case in which the first parameters in the transmission device 100 are of configuration file #1 of FIG. 5, and the second parameters in the processing circuit 210 are of configuration file #0 of FIG. 5.

In the present example, the first parameters in the transmission device 100 and the second parameters in the processing circuit 210 do not match. For example, the data rate (4.9152 Gbps) of the serial data 301 transmitted by the transmission device 100 and the data rate (9.8304 Gbps) configured in the PHY section 212 do not match. In this case, after the system 400 is started or after reset is cancelled, a link is not established between the transmission device 100 and the processing circuit 210 of the reception device 200. Thus, the state of JESD204B is CGS being an initial state. The transmission device 100 and the reception device 200 perform the link establishment procedure (linkup sequence) as follows.

In CGS, the transmission device 100 continues to transmit K (K28.5=BCh).

As described above, the data rate of the serial data 301 transmitted by the transmission device 100 and the data rate configured in the PHY section 212 are different from each other, and thus the CDR function of the PHY section 212 is not locked. Thus, this causes the CDR LOCK 302 to be "0000". Then, the state of CDR LOCK 302="0000" continues.

In a case in which the state of CDR LOCK 302="0000" continues for a predetermined period of time, the synchronization monitoring section 214 determines that the data rate of the serial data 301 transmitted by the transmission device 100 and the data rate configured in the PHY section 212 do not match. Then, the synchronization monitoring section 214 changes the data rate (i.e., 9.8304 Gbps) in the PHY section 212 to "4.9152 Gbps", using the PHY configuration 307. Furthermore, the synchronization monitoring section 214 resets the PHY section 212, using the PHY configuration 307.

During the processing as well, the state remains in CGS. Thus, the transmission device 100 continues to transmit K (K28.5=BCh).

After the PHY section 212 is reset, the data rate of the serial data 301 transmitted by the transmission device 100 and the data rate configured in the PHY section 212 match. Thus, the lock of the CDR function causes the CDR_LOCK 302 to be "1111".

The synchronization monitoring section 214 receives the CDR LOCK 302. The synchronization monitoring section 214 causes the clock driver 220 to output the SYSREF 310 and the SYSREF 311, similarly to the case of operation example 1. Specifically, the synchronization monitoring section 214 outputs the clock driver control 309 to the clock driver 220. In response to this, the clock driver 220 outputs the SYSREF 310 to the transmission device 100, and outputs the SYSREF 311 to the synchronization detection section 213.

The synchronization detection section 213 detects "SYS-REF 311=1". The synchronization detection section 213 resets LMFC timing in the processing circuit 210. Next, in a case in which the synchronization detection section 213 detects that there is not an 8B/10B error in the parallel data 303 in Lane #0, the synchronization detection section 213 notifies the synchronization monitoring section 214 of this, using the control/notification 306. Thus, the synchronization monitoring section 214 detects the lock of the CDR function corresponding to Lane #0 in the CDR LOCK 302, and detects that there is not an 8B/10B error in the parallel data 303. In response to the detection, the synchronization monitoring section 214 sets the SYNCB 308 to "1", and outputs the SYNCB 308 to the transmission device 100.

The transmission device 100 detects "SYSREF 310=1". The transmission device 100 resets internal LMFC timing of the transmission device 100. Next, the transmission device 100 detects "SYNCB 308=1". With this, the transmission device 100 transitions to ILAS from the next LMFC timing.

In ILAS, the synchronization detection section 213 receives the above-described four consecutive multi-frames (multi-frames 1 to 4) via the PHY section 212. The synchronization detection section 213 extracts the parameters of JESD204B (i.e., the first parameters in the transmission device 100) illustrated in FIG. 6. The synchronization detection section 213 stores the extracted first parameters in the register.

In a case in which the synchronization detection section 213 completes storing the parameters in the register, the synchronization detection section 213 transmits the control/notification 306 to the synchronization monitoring section 214.

In response to the control/notification 306, the synchronization monitoring section 214 compares the contents of the parameters stored in the register (i.e., the first parameters in the transmission device 100) and the second parameters in the processing circuit 210. The contents of the first parameters stored in the register and the contents of the second parameters in the processing circuit 210 do not match. Specifically, M and F in the first parameters and M and F in the second parameters are respectively different from each other.

Furthermore, the synchronization monitoring section 214 calculates the third parameter from the first parameters stored in the register. The synchronization monitoring section 214 compares the calculated third parameter and the fourth parameter in the clock driver 220. The third parameter and the fourth parameter are a period of the LMFC. In the present example, the period of the LMFC (fourth parameter) configured in the clock driver 220 does not match the calculated period of the LMFC (third parameter).

Thus, the synchronization monitoring section 214 changes the contents (specifically, M and F) of the second parameters in the synchronization detection section 213 to match the contents of the first parameters, using the parameter configuration 312. With this, the contents of the second parameters in the processing circuit 210 and the contents of the first parameters in the transmission device 100 match.

The synchronization monitoring section 214 changes the period of the LMFC (fourth parameter) configured in the clock driver 220 to match the calculated period of the LMFC (third parameter), using the clock driver control 309. Specifically, the synchronization monitoring section 214 changes the configuration of the period of SYSREF generation in the clock driver 220.

Subsequently, the JESD processing section 211 (i.e., the PHY section 212 and the synchronization detection section 213) is reset. After the second parameters in the processing circuit 210 are changed as described above, the processing circuit 210 performs the link establishment procedure again. As a result, a link between the transmission device 100 and the reception device 200 is established.

Operation Example 3

Operation example 3 is an operation of a case in which the first parameters in the transmission device 100 are of configuration file #2 of FIG. 5, and the second parameters in the processing circuit 210 are of configuration file #0 of FIG. 5.

In the present example, the data rate of the serial data 301 transmitted by the transmission device 100 and the data rate configured in the PHY section 212 match. However, other first parameters in the transmission device 100 and other second parameters in the processing circuit 210 do not match. In this case, after the system 400 is started or after reset is cancelled, a link is not established between the transmission device 100 and the processing circuit 210 of the reception device 200. Thus, the state of JESD204B is CGS being an initial state. The transmission device 100 and the reception device 200 perform the link establishment procedure (linkup sequence) as follows.

In CGS, the transmission device 100 continues to transmit K (K28.5=BCh). However, L in the first parameters is "2" (i.e., L=2). The CDR function of the PHY section 212 is locked only for two lanes. This causes the CDR LOCK 302 to be "0011".

The synchronization monitoring section 214 receives the CDR LOCK 302. In a case in which the synchronization monitoring section 214 detects the lock of the CDR function (for example, detects a bit "1" corresponding to Lane #0), the synchronization monitoring section 214 causes the clock driver 220 to output the SYSREF 310 and the SYSREF 311. Specifically, the synchronization monitoring section 214 outputs the clock driver control 309 to the clock driver 220. In response to this, the clock driver 220 outputs the SYSREF 310 to the transmission device 100, and outputs the SYSREF 311 to the synchronization detection section 213.

The synchronization detection section 213 detects "SYS-REF 311=1". The synchronization detection section 213 resets LMFC timing in the processing circuit 210. Next, in a case in which the synchronization detection section 213 detects that there is not an 8B/10B error in the parallel data 303, the synchronization detection section 213 notifies the synchronization monitoring section 214 of this, using the control/notification 306. Thus, the synchronization monitoring section 214 detects the lock of the CDR function corresponding to Lane #0 in the CDR LOCK 302, and detects that there is not an 8B/10B error in the parallel data 303. In response to the detection, the synchronization monitoring section 214 sets the SYNCB 308 to "1", and outputs the SYNCB 308 to the transmission device 100.

The transmission device 100 detects "SYSREF 310=1". The transmission device 100 resets internal LMFC timing of the transmission device 100. Next, the transmission device 100 detects "SYNCB 308=1". With this, the transmission device 100 transitions to ILAS from the next LMFC timing.

In ILAS, the synchronization detection section 213 receives the above-described four consecutive multi-frames (multi-frames 1 to 4) via the PHY section 212. The synchronization detection section 213 extracts the parameters of JESD204B (i.e., the first parameters in the transmission device 100) illustrated in FIG. 6. The synchronization detection section 213 stores the extracted first parameters in the register.

In a case in which the synchronization detection section 213 completes storing the parameters in the register, the synchronization detection section 213 transmits the control/notification 306 to the synchronization monitoring section 214.

In response to the control/notification 306, the synchronization monitoring section 214 compares the contents of the parameters stored in the register (i.e., the first parameters in the transmission device 100) and the second parameters in the processing circuit 210. The contents of the first parameters stored in the register and the contents of the second parameters in the processing circuit 210 do not match. Specifically, L and M in the first parameters and L and M in the second parameters are respectively different from each other.

Furthermore, the synchronization monitoring section 214 calculates the third parameter from the first parameters stored in the register. The synchronization monitoring section 214 compares the calculated third parameter and the fourth parameter in the clock driver 220. In the present example, the third parameter and the fourth parameter are a period of the LMFC. The period of the LMFC (fourth parameter) configured in the clock driver 220 matches the calculated period of the LMFC (third parameter).

Thus, the synchronization monitoring section 214 changes the contents (specifically, L and M) of the second parameters in the synchronization detection section 213 to match the contents of the first parameters, using the parameter configuration 312. With this, the contents of the second parameters in the processing circuit 210 and the contents of the first parameters in the transmission device 100 match.

Subsequently, the JESD processing section 211 (i.e., the PHY section 212 and the synchronization detection section 213) is reset. After the second parameters in the processing circuit 210 are changed as described above, the processing circuit 210 performs the link establishment procedure again. As a result, a link between the transmission device 100 and the reception device 200 is established.

Operation Example 4

Operation example 4 is an operation of a case in which the first parameters in the transmission device 100 are of configuration file #3 of FIG. 5, and the second parameters in the processing circuit 210 are of configuration file #0 of FIG. 5.

In the present example, the data rate of the serial data 301 transmitted by the transmission device 100 and the data rate configured in the PHY section 212 match. However, other first parameters in the transmission device 100 and other second parameters in the processing circuit 210 do not match. In this case, after the system 400 is started or after reset is cancelled, a link is not established between the transmission device 100 and the processing circuit 210 of the reception device 200. Thus, the state of JESD204B is CGS being an initial state. The transmission device 100 and the reception device 200 perform the link establishment procedure (linkup sequence) as follows.

In CGS, the transmission device 100 continues to transmit K (K28.5=BCh). The data rate of the serial data 301 transmitted by the transmission device 100 and the data rate configured in the PHY section 212 match. However, L in the first parameters is "2" (i.e., L=2). As described above, this causes the CDR_LOCK 302 to be "0011".

The synchronization monitoring section 214 receives the CDR LOCK 302. In a case in which the synchronization monitoring section 214 detects the lock of the CDR function (for example, detects a bit "1" corresponding to Lane #0), the synchronization monitoring section 214 causes the clock driver 220 to output the SYSREF 310 and the SYSREF 311. Specifically, the synchronization monitoring section 214 outputs the clock driver control 309 to the clock driver 220. In response to this, the clock driver 220 outputs the SYSREF 310 to the transmission device 100, and outputs the SYSREF 311 to the synchronization detection section 213.

The synchronization detection section 213 detects "SYSREF 311=1". The synchronization detection section 213 resets LMFC timing in the processing circuit 210. Furthermore, in a case in which the synchronization detection section 213 detects that there is not an 8B/10B error in the parallel data 303, the synchronization detection section 213 notifies the synchronization monitoring section 214 of this, using the control/notification 306. Thus, the synchronization monitoring section 214 detects the lock of the CDR function corresponding to Lane #0 in the CDR_LOCK 302, and detects that there is not an 8B/10B error in the parallel data 303. In response to the detection, the synchronization monitoring section 214 sets the SYNCB 308 to "1", and outputs the SYNCB 308 to the transmission device 100.

The transmission device 100 detects "SYSREF 310=1". The transmission device 100 resets internal LMFC timing of the transmission device 100. Next, the transmission device 100 detects "SYNCB 308=1". With this, the transmission device 100 transitions to ILAS from the next LMFC timing.

In ILAS, the synchronization detection section 213 receives the above-described four consecutive multi-frames (multi-frames 1 to 4) via the PHY section 212. The synchronization detection section 213 extracts the parameters of JESD204B (i.e., the first parameters in the transmission device 100) illustrated in FIG. 6. The synchronization detection section 213 stores the extracted first parameters in the register.

In a case in which the synchronization detection section 213 completes storing the parameters in the register, the synchronization detection section 213 transmits the control/notification 306 to the synchronization monitoring section 214.

In response to the control/notification 306, the synchronization monitoring section 214 compares the contents of the parameters stored in the register (i.e., the first parameters in the transmission device 100) and the second parameters in the processing circuit 210. The contents of the first parameters stored in the register and the contents of the second parameters in the processing circuit 210 do not match. Specifically, L and F in the first parameters and L and F in the second parameters are respectively different from each other.

Furthermore, the synchronization monitoring section 214 calculates the third parameter from the first parameters stored in the register. The synchronization monitoring section 214 compares the calculated third parameter and the fourth parameter in the clock driver 220. The third parameter and the fourth parameter are a period of the LMFC. In the present example, the period of the LMFC (fourth parameter) configured in the clock driver 220 does not match the calculated period of the LMFC (third parameter).

Thus, the synchronization monitoring section 214 changes the contents (specifically, L and F) of the second parameters in the synchronization detection section 213 to match the contents of the first parameters, using the parameter configuration 312. With this, the contents of the second parameters in the processing circuit 210 and the contents of the first parameters in the transmission device 100 match.

The synchronization monitoring section 214 changes the period of the LMFC (fourth parameter) configured in the clock driver 220 to match the contents of the third parameter, using the clock driver control 309. Specifically, the synchronization monitoring section 214 changes the configuration of the period of SYSREF generation in the clock driver 220. Subsequently, the JESD processing section 211 (i.e., the PHY section 212 and the synchronization detection section 213) is reset. After the second parameters in the processing circuit 210 are changed as described above, the processing circuit 210 performs the link establishment procedure again. As a result, a link between the transmission device 100 and the reception device 200 is established.

2-5. Flow of Processing of Reception Device

Figure 7:
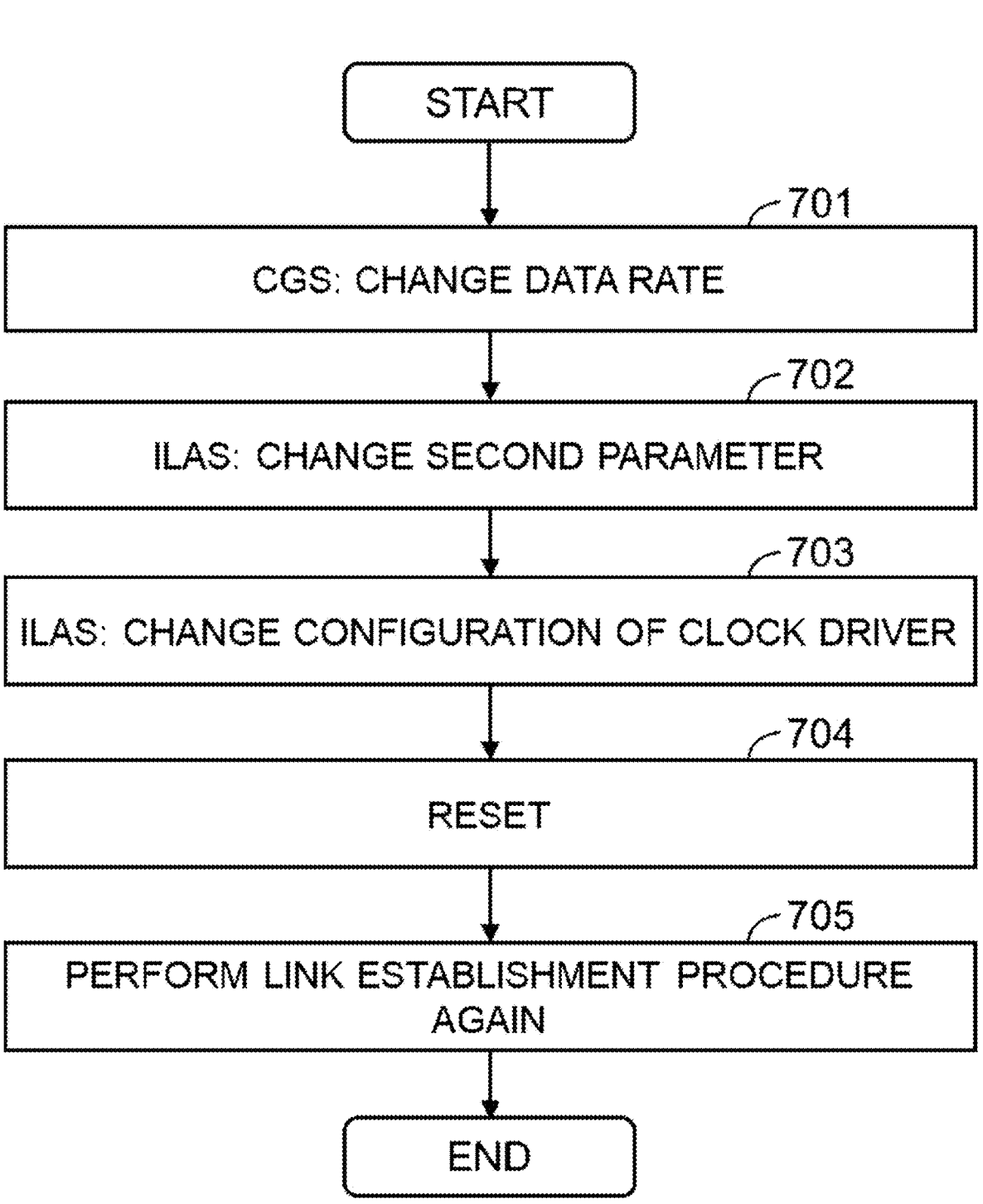
FIG. 7 is a flowchart illustrating an example of a flow of processing of changing of parameters (second parameters) of JESD204B in the reception device.

Next, with reference to FIG. 7, a flow of processing of changing the second parameters in the reception device 200 (specifically, the processing circuit 210) will be described. FIG. 7 is a flowchart illustrating an example of a flow of processing of changing the second parameters.

As described above, in CGS, in a case in which the data rate of the serial data 301 transmitted by the transmission device 100 and the data rate configured in the PHY section 212 do not match, the processing circuit 210 changes the data rate in the PHY section 212 to match the data rate configured in the transmission device 100 (701).

Note that, in a case in which the data rate of the serial data 301 transmitted by the transmission device 100 and the data rate configured in the PHY section 212 match, step 701 is omitted.

After step 701, the state transitions from CGS to ILAS. As described above, in ILAS, the processing circuit 210 compares the contents of the parameters stored in the register (i.e., the first parameters in the transmission device 100) and the second parameters in the processing circuit 210. In a case in which the contents of the first parameters stored in the register and the contents of the second parameters in the processing circuit 210 do not match, the processing circuit 210 changes the contents of the second parameters in the processing circuit 210 to match the contents of the first parameters (702).

Note that, in a case in which the contents of the first parameters stored in the register and the contents of the second parameters in the processing circuit 210 match, step 702 is omitted.

As described above, in ILAS, the processing circuit 210 compares the third parameter calculated from the first parameters and the fourth parameter in the clock driver 220. In the present example, the third parameter and the fourth parameter are a period of the LMFC. In a case in which the period of the LMFC (fourth parameter) configured in the clock driver 220 does not match the calculated period of the LMFC (third parameter), as described above, the processing circuit 210 changes the configuration of the period of SYSREF generation in the clock driver 220 (703).

Note that, in a case in which the period of the LMFC (fourth parameter) configured in the clock driver 220 matches the calculated period of the LMFC (third parameter), step 703 is omitted.

Subsequently, the JESD processing section 211 in the processing circuit 210 is reset (704). Then, the processing circuit 210 performs the link establishment procedure again (705). With this, a link between the transmission device 100 and the reception device 200 is established.

2-6. Effects

According to the configuration, the processing circuit 210 of the reception device 200 has a function of receiving the parameters (i.e., the first parameters) of JESD204 from the transmission device 100 and a function of changing the parameters (i.e., the second parameters) of JESD204 in the processing circuit 210 to match the first parameters. In other words, the processing circuit 210 can select parameters of JESD204 corresponding to an appropriate configuration file out of the plurality of configuration files 0 #to #3 configured in advance, and perform the link establishment procedure (linkup sequence) to establish a link with the transmission device 100. According to the configuration, even in a case in which the first parameters in the transmission device 100 are changed using the control computer 300 (i.e., even in a case in which the configuration file is changed, the processing circuit 210 can automatically change its second parameters and implement a linkup for the change.

Furthermore, according to the configuration, the configuration (for example, the FPGA) of the reception device 200 can be commonalized, regardless of the transmission device 100.

This obviates the need for reconfiguration of the FPGA in evaluation of the FPGA, and can thereby reduce evaluation time.

In a case in which a plurality of devices having different parameters of JESD204B are designed, the configuration of the reception device 200 can be repurposed. Therefore, designing time of the device can be reduced.

Because this is a link establishment procedure (JESD linkup sequence) using hardware control, software need not be engaged in the linkup, and resources can be assigned to another configuration or the like. Furthermore, loads of elements (for example, the CPU) present around the reception device 200 can be reduced.

2-7. Example Alterations

The technology related to the present disclosure is not limited to the example embodiments described above.

(1) First Example Alteration

As described above, an example in which the ADC and the DAC are implemented in one TRX_IC will be described.

For example, the TRX_IC includes a first reception device to connect to the ADC and a second reception device to connect to the DAC. The first reception device and the second reception device have configurations similar to that of the reception device 200 described above. In such a configuration, a combination of parameters of JESD204B of the ADC and parameters of JESD204B of the DAC may be configured as one configuration file.

FIG. 8 is a diagram illustrating configuration files #0 to #3 defining combinations of the parameters of JESD204B of the ADC and the parameters of JESD204B of the DAC. In the present example, in a case in which one configuration file is selected, a combination of the parameters of the ADC and the parameters of the DAC is determined. After a link between the ADC and the first reception device is established in accordance with the method described above, the link establishment procedure between the DAC and the second reception device may be performed. According to the configuration, a linkup with the ADC and a linkup with the DAC can be completed in order.

Note that the parameters of the ADC and the parameters of the DAC may be configured to have the same contents. In this case as well, after a link between the ADC and the first reception device is established in accordance with the method described above, the link establishment procedure between the DAC and the second reception device may be performed.

(2) Second Example Alteration

Figure 9:
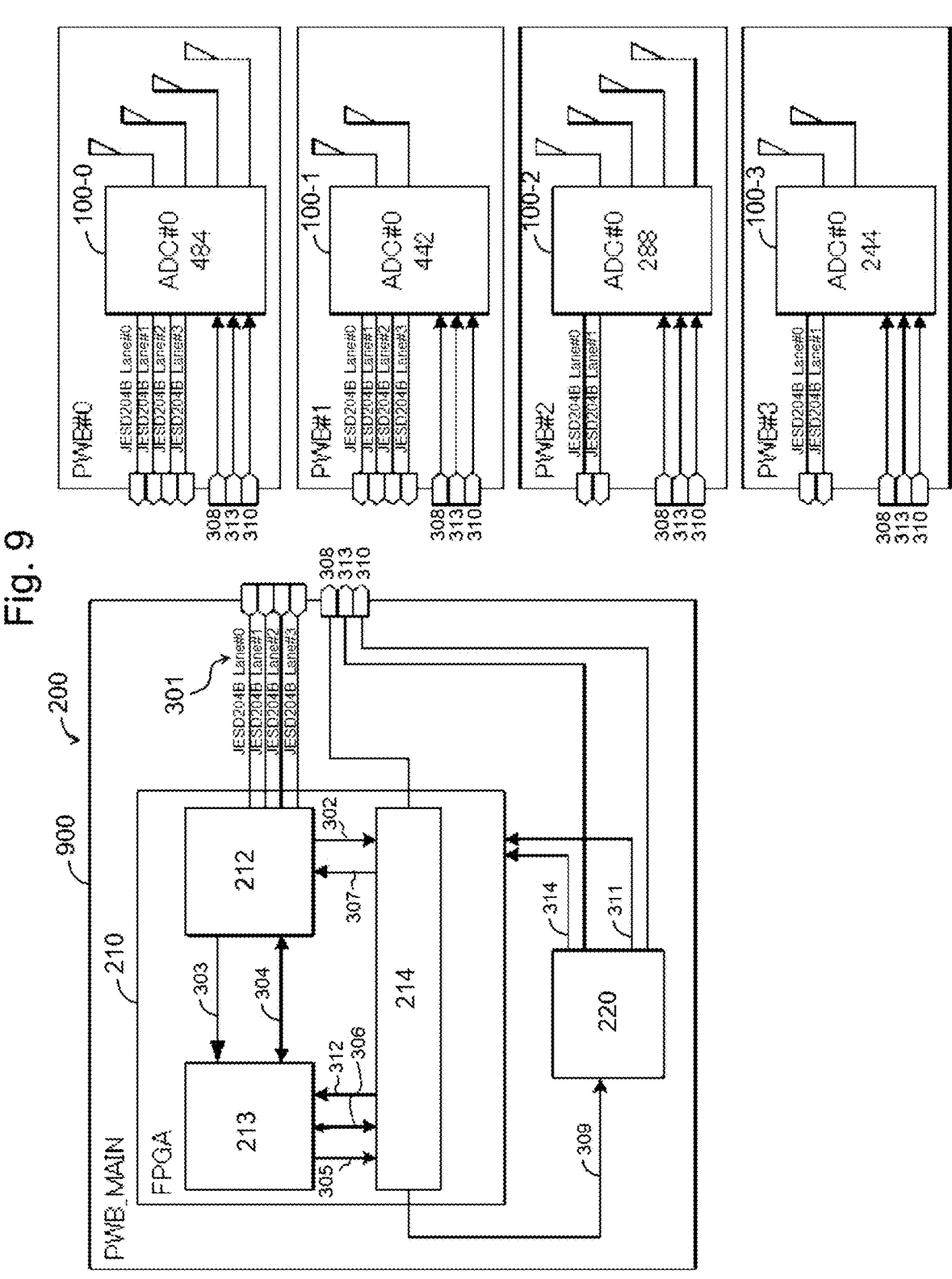
FIG. 9 is a diagram illustrating an example of a configuration of a system according to a second example alteration of the first example embodiment.

FIG. 9 is a diagram illustrating an example of a configuration of a system according to a second example alteration. In the present example, the reception device 200 connects to a plurality of transmission devices (ADCs) 100-0 to 100-3. The reception device 200 is implemented in a main PWB 900. The plurality of transmission devices 100-0 to 100-3 are respectively implemented in a plurality of sub-PWBs #0 to #3. Furthermore, different configuration files are configured for the plurality of transmission devices 100-0 to 100-3. Conventionally, in such a configuration, the reception device 200 requires reconfiguration in accordance with the transmission devices (ADCs) to connect to. According to the commonalized reception device 200 of the present example, the link establishment procedure (linkup sequence) can be performed without reconfiguration.

Figure 10:
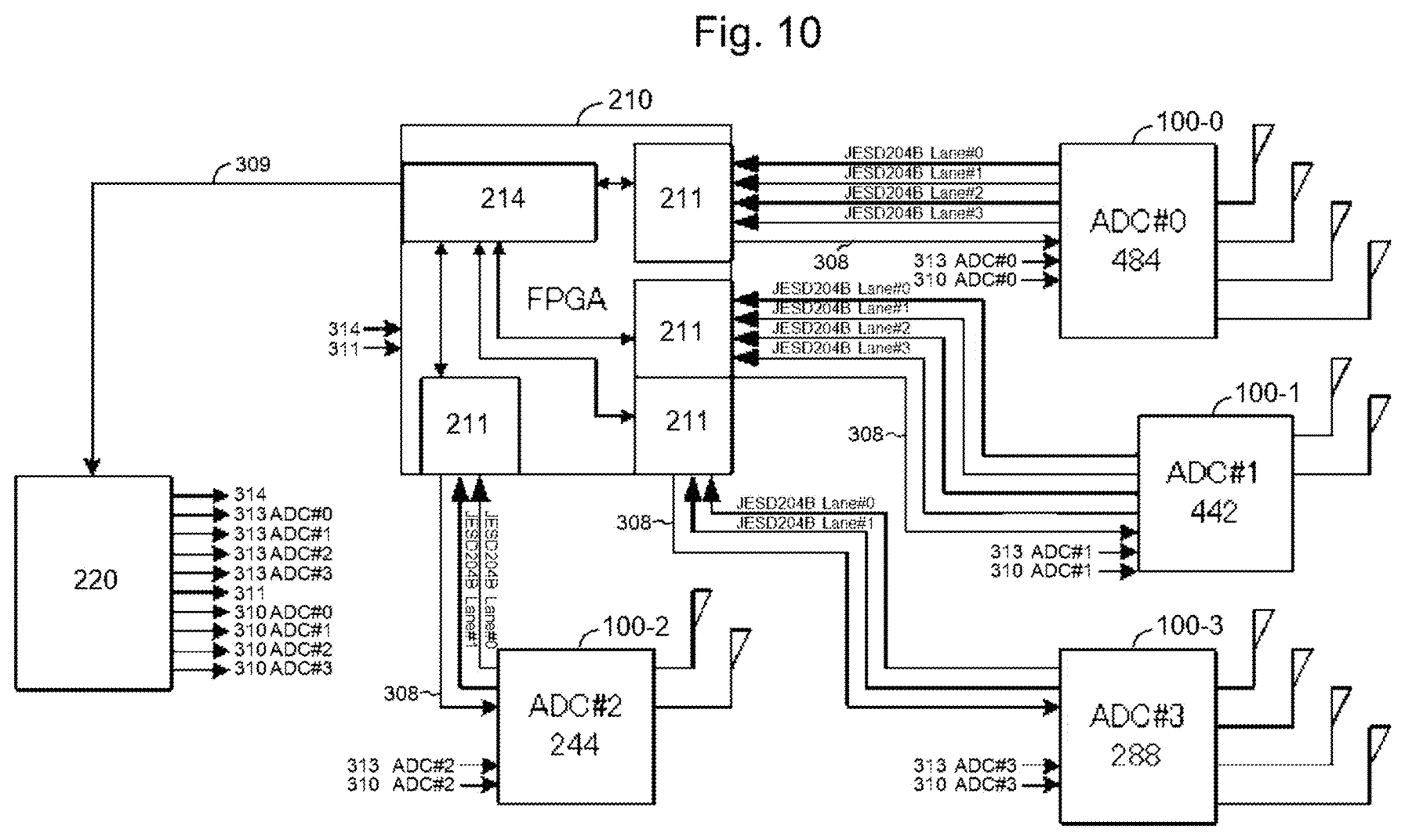

FIG. 10 is a diagram illustrating another example of a configuration of a system according to the second example alteration. The processing circuit 210 includes a plurality of JESD processing sections 211 (including the PHY section 212 and the synchronization detection section 213) corresponding to the plurality of transmission devices 100-0 to 100-3. In such a configuration as well, similarly to the above description, according to the commonalized reception device 200 of the present example, the linkup sequence can be performed without reconfiguration.

(3) Third Example Alteration

FIG. 11 is a diagram illustrating an example of a configuration of a system according to a third example alteration. Each of apparatuses A to D includes the transmission device (ADC) 100 and the reception device 200. The JESD parameters of the transmission device 100 in the apparatuses A to D are different from each other. In such a configuration, configuration of the reception device 200 need not be changed for each of the apparatuses A to D. The commonalized reception device 200 of the present example can establish a linkup with the transmission device without a change of the configuration.

(4) Fourth Example Alteration

Figure 12:
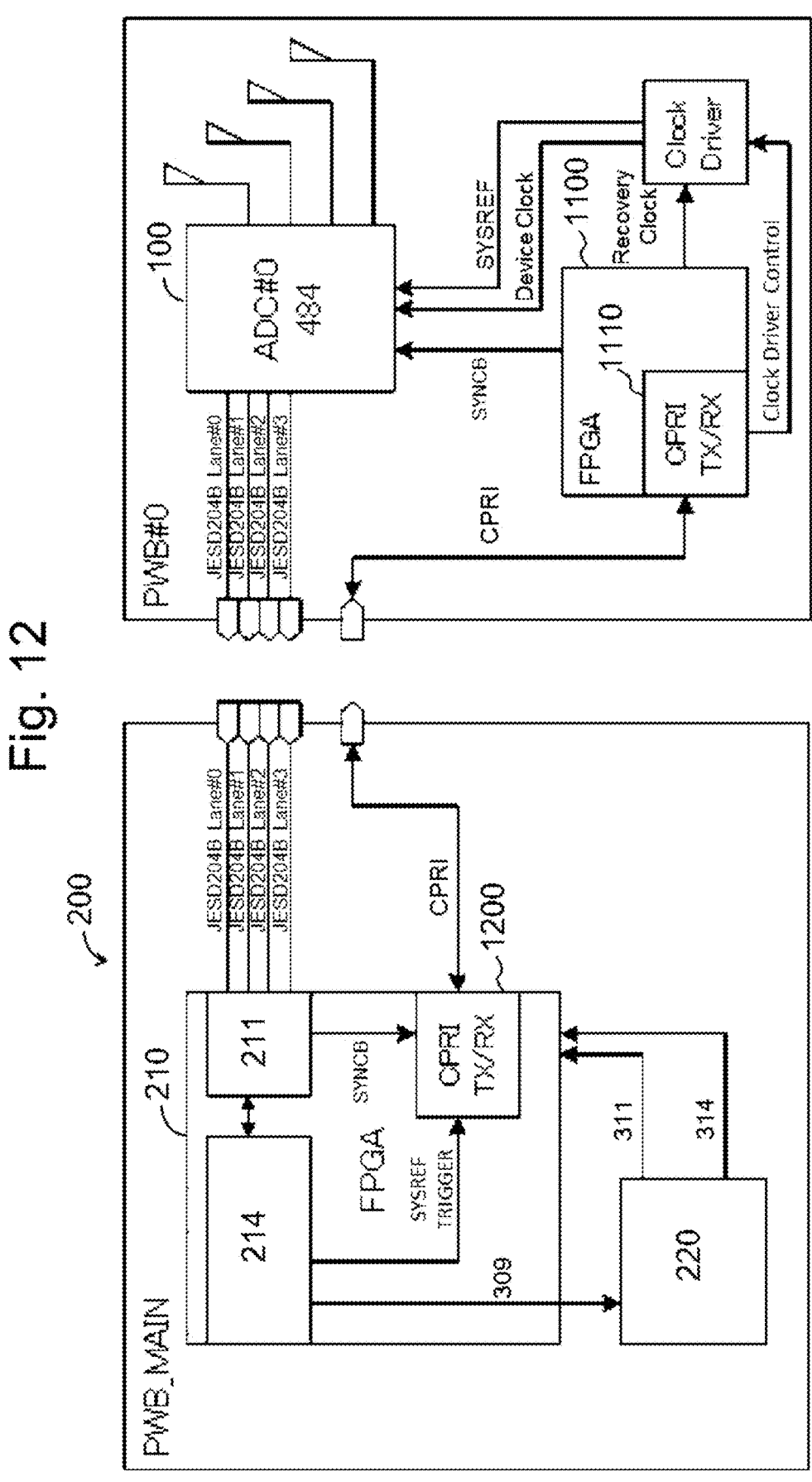
FIG. 12 is a diagram illustrating an example of a configuration of a system according to a fourth example alteration of the first example embodiment.

FIG. 12 is a diagram illustrating an example of a configuration of a system according to a fourth example alteration. In the present example, a Common Public Radio Interface (CPRI) is applied to connection between the transmission device 100 and the reception device 200. The CPRI is an interface used in communication between a base band unit (BBU) and a remote radio head (RRH) in a system in which a radio digital processing section (the BBU) and an extended antenna section (the RRH) of the base station are separated. In the configuration, the processing circuit 210 includes a transmission and reception section 1200 for the CPRI. Similarly, an FPGA 1100 on the transmission device 100 side also includes a transmission and reception section 1110 for the CPRI. This enables transmission and reception of various signals in the link establishment procedure between the transmission and reception section 1200 and the transmission and reception section 1110.

Figure 13:
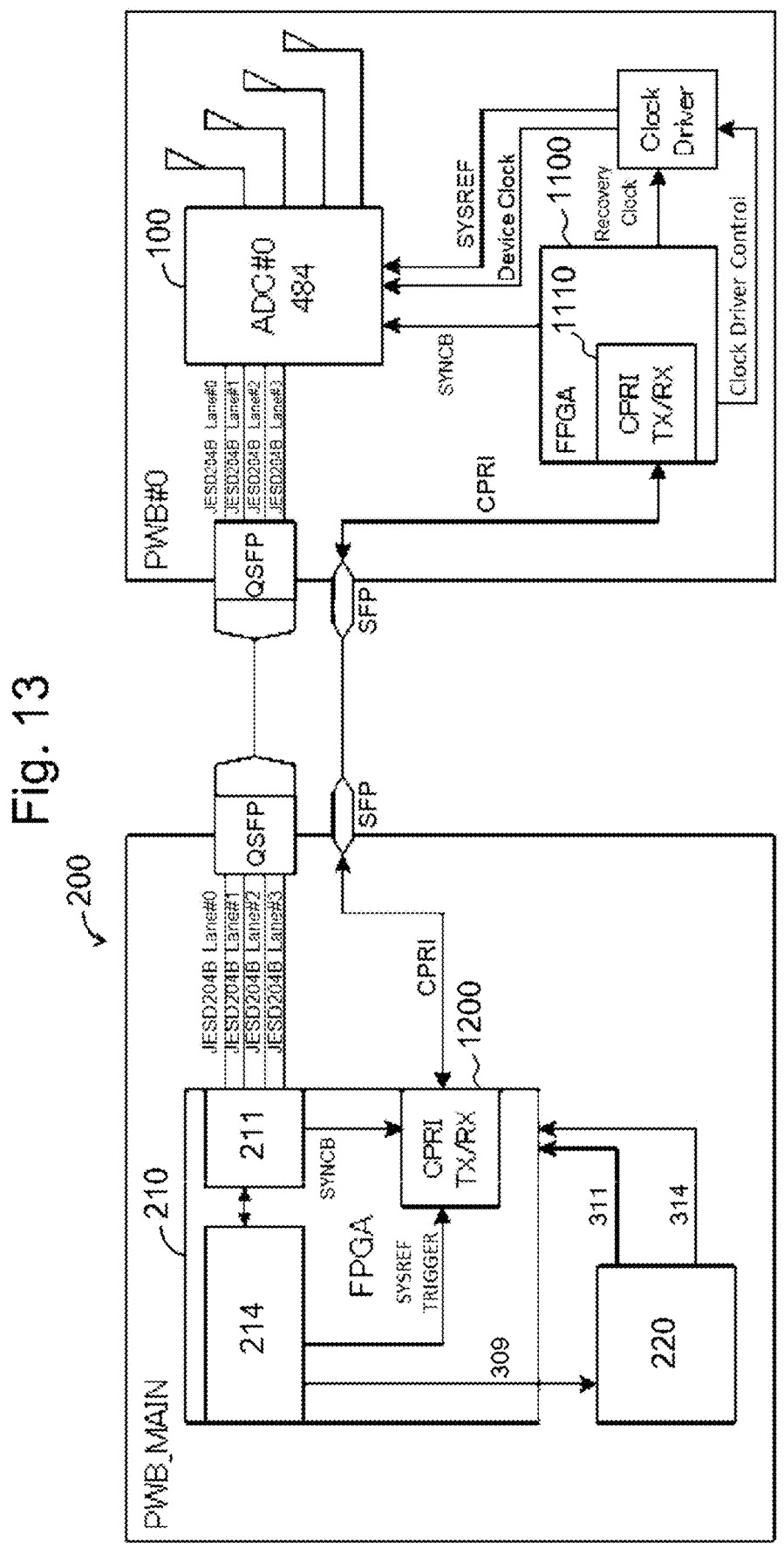
FIG. 13 is a diagram illustrating an example of a configuration of a system according to the fourth example alteration of the first example embodiment.

FIG. 13 is a diagram illustrating another example of a configuration of a system according to the fourth example alteration. In the present example, as a derived model of the CPRI, Quad Small Form-factor Pluggable (QSFP) and Small Form-factor Pluggable (SFP) are used.

Figure 14:
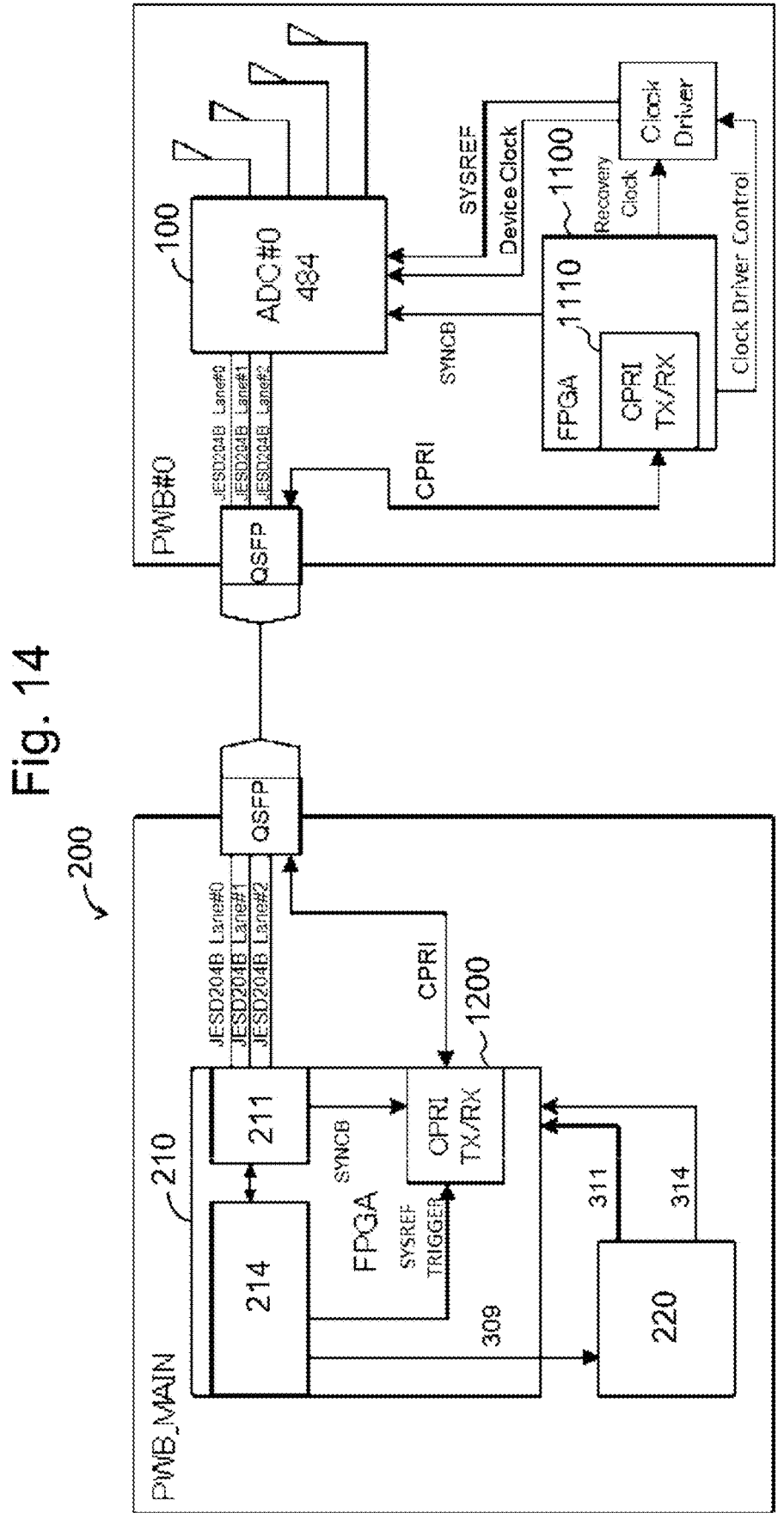
FIG. 14 is a diagram illustrating an example of a configuration of a system according to the fourth example alteration of the first example embodiment.

FIG. 14 is a diagram illustrating another example of a configuration of a system according to the fourth example alteration. In the present example, as a derived model of the CPRI, QSFP is used. The main PWB and the sub-PWB are connected using a single optical cable.

Effects of the examples illustrated in FIG. 12 to FIG. 14 will be described. In the example illustrated in FIG. 9, signals between the main PWB and the sub-PWB include a device clock, control signals (SYSREF, SYNCB), and the like, in addition to a main signal.

In a case in which control in the ADC is added (for example, in a case in which control using the SPI is added), signals between the main PWB and the sub-PWB need to include a serial clock (SCLK) signal, a serial data input (SDI) signal, a serial data output (SDO) signal, and a chip select bar (CSB) signal. The number of such signals increases in proportion to the number of ADCs implemented in the sub-PWB.

In the following, the CPRI and the derived models of the CPRI described above are simply referred to as the "CPRI". To address the above issue, by using the reception device 200, the control signals can be integrated via a high-speed serial interface having a clock transmission function as the CPRI. Furthermore, by using the CPRI, the amount of delay between the main PWB and the sub-PWB can be known owing to Round Trip Delay (T12+T34), a difference of timings between the control signals on the transmission device 100 side and the control signals on the reception device 200 side can be corrected.

Furthermore, the clock driver may be configured so that the recovery clock of the CPRI is used as the reference clock. According to the configuration, a clock synchronized with the device clock of the main PWB can be generated.

Because delay deviation by the CPRI is 1 clk, deviation of 1 clk is also generated in generation of SYSREF. When a case where the delay deviation is +0 clk and a case where the delay deviation is +1 clk is considered, there is a variation in delays in a manner that TX (downlink (DL)) delay is +1 clk and RX (uplink (UL)) delay is −1 clk. In a case in which the operation clock is set to 245.76 MHz, the delay deviation is approximately ±2 ns, which is equivalent to the delay deviation of an existing apparatus.

Figure 15:
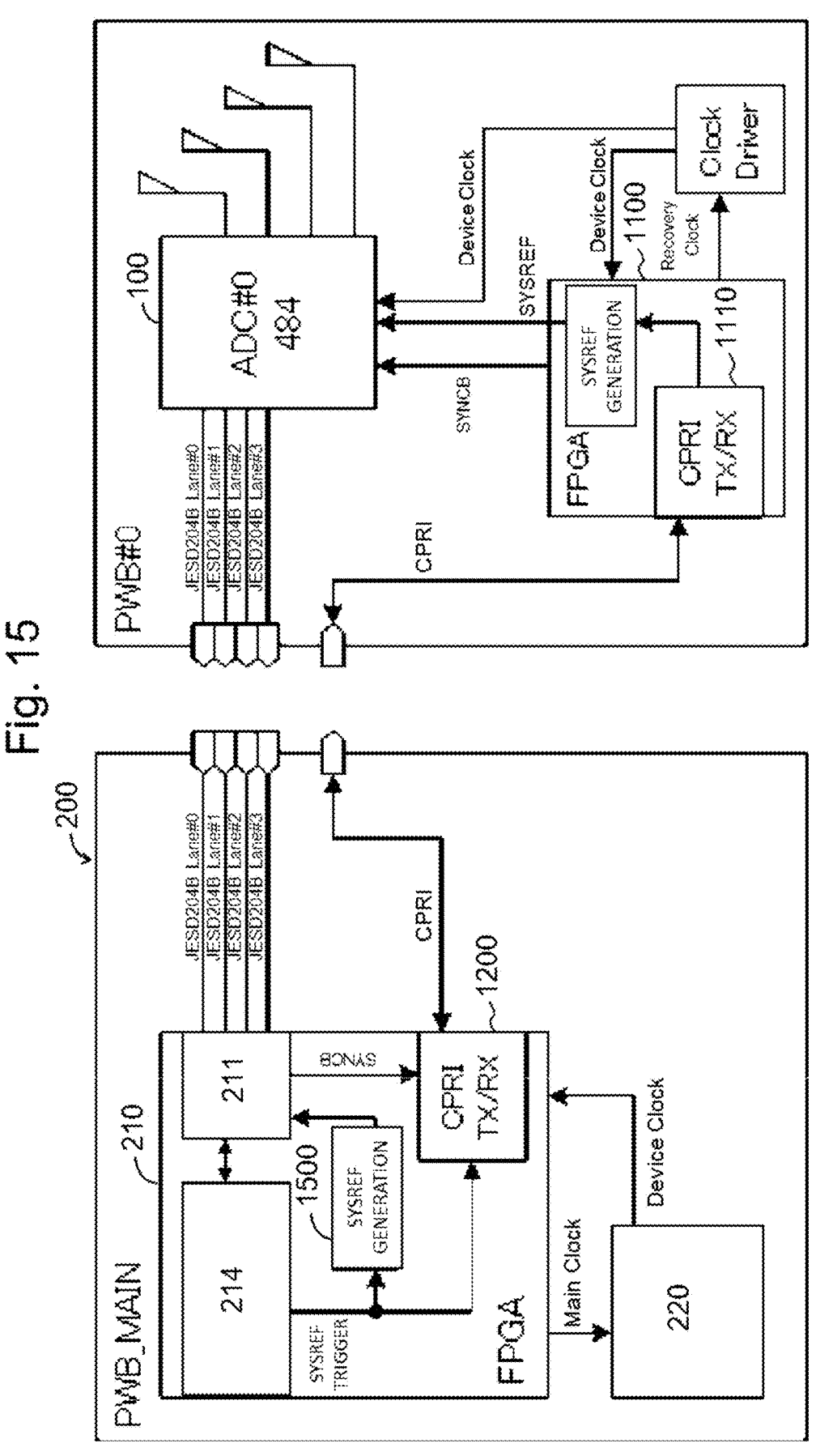
FIG. 15 is a diagram illustrating an example of a configuration of a system according to the fourth example alteration of the first example embodiment.

FIG. 15 is a diagram illustrating another example of a configuration of a system according to the fourth example alteration. In the examples of FIG. 12 to FIG. 14, the clock driver is implemented in each of the main PWB and the sub-PWB. Furthermore, SYSREF is generated in each of the main PWB and the sub-PWB. SYSREF is generated by being subjected to frequency division from original oscillation of the device clock, and thus phase cannot be aligned between the plurality of PWBs. However, in a case in which the FPGA of the main PWB and the FPGA of the sub-PWB are connected using the CPRI, timings of the control signals can be aligned. According to the configuration, a SYSREF generation function can be implemented in the FPGA of the main PWB.

In the example of FIG. 15, the FPGA in which processing circuit 210 is implemented further includes a SYSREF generation function 1500. Note that the phase of SYSREF generated by the SYSREF generation function 1500 needs to be aligned with the phase of the device clock of the ADC so as to be securely taken into by the ADC. This can be implemented by timing restriction in the FPGA, Retiming in the clock driver, and the like.

3. Second Example Embodiment

Next, with reference to FIG. 16 to FIG. 17, a second example embodiment will be described. The above-described first example embodiment is a concrete example embodiment, whereas the second example embodiment is a more generalized example embodiment.

3-1. Configuration of Link Establishment Apparatus

Figure 16:
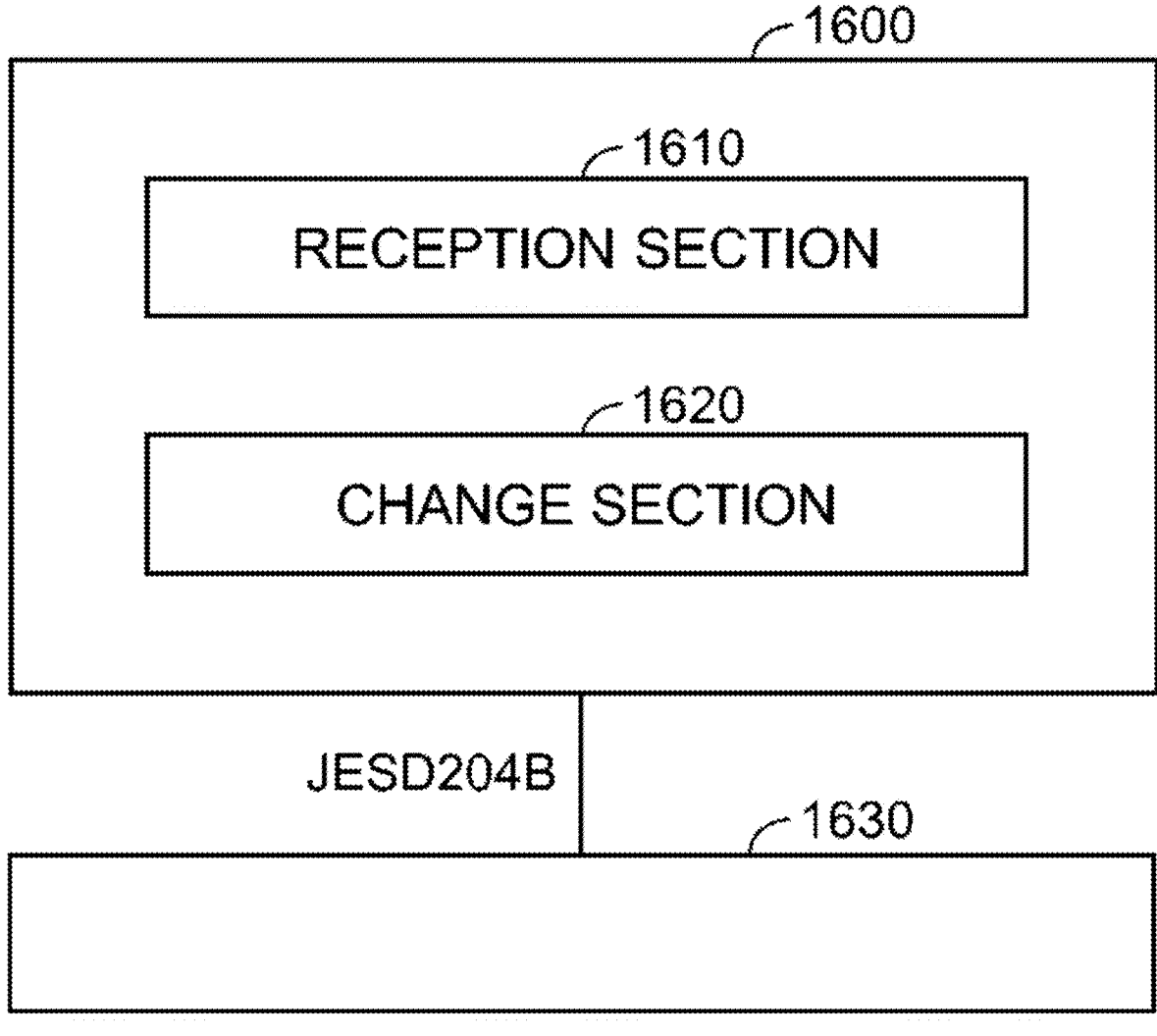
FIG. 16 is a diagram illustrating an example of a configuration of a link establishment apparatus according to a second example embodiment.

FIG. 16 is a diagram illustrating an example of a configuration of a link establishment apparatus 1600. The link establishment apparatus 1600 connects to another apparatus 1630 via an interface of JESD204B. The link establishment apparatus 1600 is configured to perform a link establishment procedure for establishing a link with such another apparatus 1630. Such another apparatus 1630 may be the transmission device 100.

The link establishment apparatus 1600 includes a reception section 1610 and a change section 1620. The reception section 1610 receives a first parameter of JESD204B from such another apparatus 1630 in the link establishment procedure. In a case in which a second parameter of JESD204B configured in the link establishment apparatus 1600 does not match the first parameter received by the reception section 1610, the change section 1620 changes the second parameter to match the first parameter.

The reception section 1610 may operate in the same manner as the JESD processing section 211. The change section 1620 may operate in the same manner as the synchronization monitoring section 214.

3-2. Flow of Processing

Figure 17:
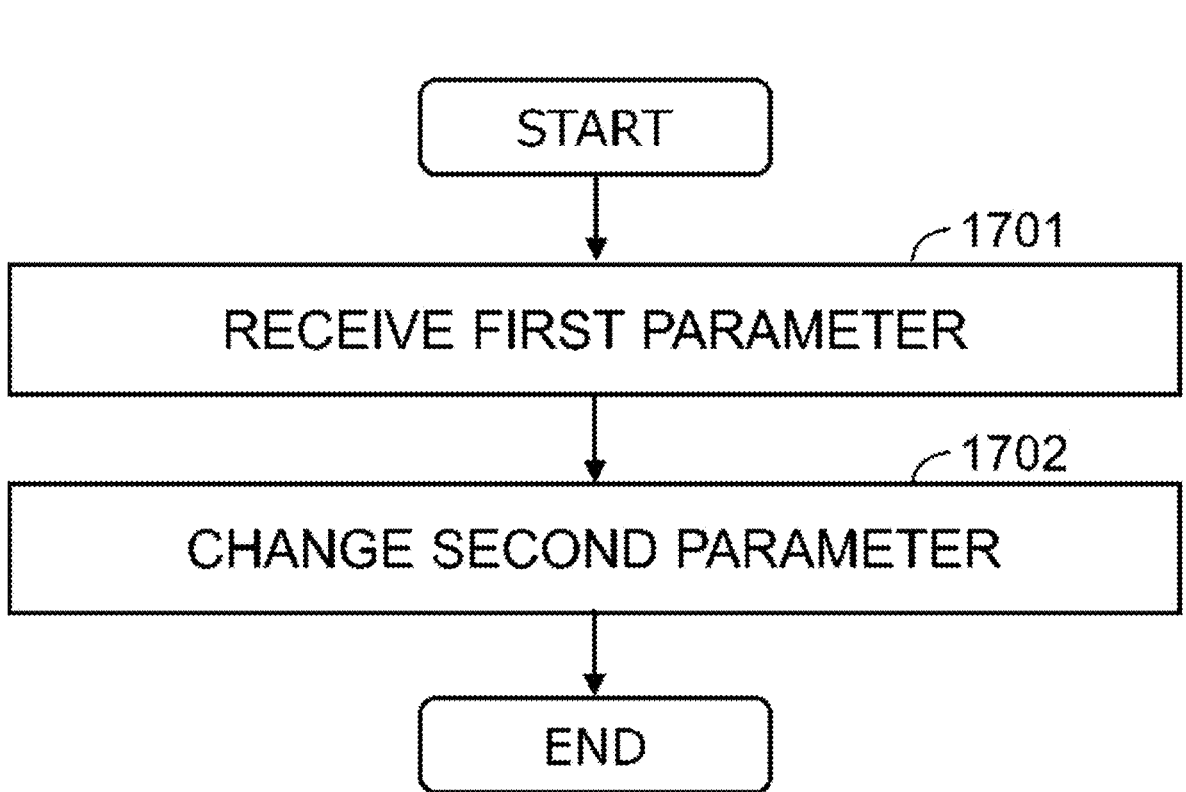
FIG. 17 is a flowchart illustrating an example of a flow of processing of the link establishment apparatus according to the second example embodiment.

FIG. 17 is a flowchart for illustrating an example of a flow of processing of the link establishment apparatus 1600. The reception section 1610 receives the first parameter of JESD204B from another apparatus 1630 in the link establishment procedure (1701). In a case in which the second parameter of JESD204B configured in the link establishment apparatus 1600 does not match the first parameter received by the reception section 1610, the change section 1620 changes the second parameter to match the first parameter (1702).

According to the configuration, even in a case in which a plurality of devices having different parameters of JESD204B are designed, the configuration of the link establishment apparatus 1600 can be commonalized. This can reduce designing time and evaluation time of the apparatus.

4. Other Example Embodiments

Note that the example embodiments and the example alterations described above are merely examples, and the scope of technical ideas of the present disclosure is not limited to the configuration described above. Other aspects conceivable within the scope of technical ideas of the present disclosure are included in the scope of the present disclosure.

The apparatus described above can be applied to a radio unit (an RU or a remote unit) of the 5th Generation (5G), an RU of the 6th Generation (6G), a MIMO-supporting radio communication apparatus, a multi-antenna-supporting radio communication apparatus, and a communication apparatus using JESD204B.

The whole or part of the example embodiments and the example alterations described above can be described as, but not limited to, the following supplementary notes.

Supplementary Note 1

A link establishment apparatus configured to connect to another apparatus via an interface of JESD204B and perform a link establishment procedure for establishing a link with the another apparatus, the link establishment apparatus including:

a receiving means for receiving a first parameter of JESD204B from the another apparatus in the link establishment procedure; and a changing means for, in a case in which a second parameter of JESD204B configured in the link establishment apparatus does not match the first parameter received by the receiving means, changing the second parameter to match the first parameter.

Supplementary Note 2

The link establishment apparatus according to Supplementary Note 1, wherein in an Initial Lane Alignment Sequence (ILAS) state of JESD204B, the receiving means receives a multi-frame from the another apparatus, and extracts the first parameter from the multi-frame, and the changing means compares the extracted first parameter and the second parameter, and determines whether or not the second parameter matches the first parameter.

Supplementary Note 3

The link establishment apparatus according to Supplementary Note 2, further including a clock driver configured to transmit a SYSREF signal in JESD204B to the link establishment apparatus and the another apparatus, wherein the changing means compares a third parameter calculated from the extracted first parameter and a fourth parameter configured in the clock driver, and in a case in which the third parameter does not match the fourth parameter, the changing means changes the fourth parameter configured in the clock driver.

Supplementary Note 4

The link establishment apparatus according to Supplementary Note 3, wherein the third parameter and the fourth parameter are a period of a Local Multi Frame Clock (LMFC).

Supplementary Note 5

The link establishment apparatus according to any one of Supplementary Notes 1 to 4, wherein the first parameter includes a first data rate, the second parameter includes a second data rate, and in a case in which the first data rate and the second data rate do not match, the changing means changes the second data rate to match the first data rate.

Supplementary Note 6

The link establishment apparatus according to any one of Supplementary Notes 1 to 5, wherein after the changing means changes the second parameter, the link establishment apparatus performs the link establishment procedure again.

Supplementary Note 7

A method performed in a link establishment apparatus configured to connect to another apparatus via an interface of JESD204B and perform a link establishment procedure for establishing a link with the another apparatus, the method including:

receiving a first parameter of JESD204B from the another apparatus in the link establishment procedure; and in a case in which a second parameter of JESD204B configured in the link establishment apparatus does not match the received first parameter, changing the second parameter to match the first parameter.

Supplementary Note 8

A system including:

a first apparatus being configured with a first parameter of JESD, the first apparatus being configured to be capable of changing the first parameter; and a second apparatus connected to the first apparatus via an interface of JESD204B, wherein the first apparatus and the second apparatus are configured to perform a link establishment procedure for establishing a link between the first apparatus and the second apparatus, and the second apparatus includes a receiving means for receiving the first parameter of JESD204B from the first apparatus in the link establishment procedure, and a changing means for, in a case in which a second parameter of JESD204B configured in the second apparatus does not match the first parameter received by the receiving means, changing the second parameter to match the first parameter.

INDUSTRIAL APPLICABILITY

The present disclosure provides a technology for communizing a circuit using JESD204B.

REFERENCE SIGNS LIST

100 Transmission Device
200 Reception Device
210 Processing Circuit
211 JESD Processing Section
212 Physical Layer (PHY) Section
213 JESD Synchronization Detection Section
214 JESD Synchronization Monitoring Section
220 Clock Driver
300 Control Computer

What is claimed is:

1. A link establishment apparatus configured to connect to another apparatus via an interface of JESD204B and perform a link establishment procedure for establishing a link with the another apparatus, the link establishment apparatus comprising:

one or more memories storing instructions; and one or more processors configured to execute the instructions to receive a first parameter of JESD204B from the another apparatus in the link establishment procedure; and in a case in which a second parameter of JESD204B configured in the link establishment apparatus does not match the received first parameter, change the second parameter to match the first parameter, wherein in an Initial Lane Alignment Sequence (ILAS) state of JESD204B, the one or more processors is configured to receive a multi-frame from the another apparatus, and extract the first parameter from the multi-frame, and the one or more processors is configured to compare the extracted first parameter and the second parameter, and determine whether or not the second parameter matches the first parameter, the link establishment apparatus further comprises a clock driver configured to transmit a SYSREF signal in JESD204B to the link establishment apparatus and the another apparatus, the one or more processors is configured to compare a third parameter calculated from the extracted first parameter and a fourth parameter configured in the clock driver, and in a case in which the third parameter does not match the fourth parameter, the one or more processors is configured to change the fourth parameter configured in the clock driver.

2. The link establishment apparatus according to claim 1, wherein the third parameter and the fourth parameter are a period of a Local Multi Frame Clock (LMFC).

3. The link establishment apparatus according to claim 1, wherein after changing the second parameter, the link establishment apparatus performs the link establishment procedure again.

4. A link establishment apparatus configured to connect to another apparatus via an interface of JESD204B and perform a link establishment procedure for establishing a link with the another apparatus, the link establishment apparatus comprising:

one or more memories storing instructions; and one or more processors configured to execute the instructions to receive a first parameter of JESD204B from the another apparatus in the link establishment procedure; and in a case in which a second parameter of JESD204B configured in the link establishment apparatus does not match the received first parameter, change the second parameter to match the first parameter, wherein the first parameter includes a first data rate, the second parameter includes a second data rate, and in a case in which the first data rate and the second data rate do not match, the one or more processors is configured to change the second data rate to match the first data rate.

5. A method performed in a link establishment apparatus configured to connect to another apparatus via an interface of JESD204B and perform a link establishment procedure for establishing a link with the another apparatus, the method comprising:

receiving a first parameter of JESD204B from the another apparatus in the link establishment procedure; and in a case in which a second parameter of JESD204B configured in the link establishment apparatus does not match the received first parameter, changing the second parameter to match the first parameter, wherein the method further comprises:

in an Initial Lane Alignment Sequence (ILAS) state of JESD204B, receiving a multi-frame from the another apparatus, and extracting the first parameter from the multi-frame, comparing the extracted first parameter and the second parameter, and determining whether or not the second parameter matches the first parameter;

the link establishment apparatus comprises a clock driver configured to transmit a SYSREF signal in JESD204B to the link establishment apparatus and the another apparatus, and the method further comprises:

comparing a third parameter calculated from the extracted first parameter and a fourth parameter configured in the clock driver, and n a case in which the third parameter does not match the fourth parameter, changing the fourth parameter configured in the clock driver.

* * * * *